US010919207B2

(12) United States Patent
Mellen et al.

(10) Patent No.: US 10,919,207 B2
(45) Date of Patent: Feb. 16, 2021

(54) BLOW MOULDING MACHINE, PREFORMS, SYSTEM AND PROCESS

(71) Applicant: Integrated Plastics Pty Limited, Villawood (AU)

(72) Inventors: Nick Mellen, Villawood (AU); Ho-Seon Kim, Ansan-si (KR)

(73) Assignee: INTEGRATED PLASTICS PTY LIMITED, Villawood (AU)

( * ) Notice: Subject to any disclaimer, the term of this patent is extended or adjusted under 35 U.S.C. 154(b) by 197 days.

(21) Appl. No.: 15/995,531

(22) Filed: Jun. 1, 2018

(65) Prior Publication Data

US 2019/0084210 A1    Mar. 21, 2019

(30) Foreign Application Priority Data

Sep. 21, 2017 (AU) ................ 2017903839
Mar. 9, 2018 (AU) ................ 2018900795
Apr. 10, 2018 (AU) ................ 2018901184

(51) Int. Cl.
| | |
|---|---|
| B29C 49/36 | (2006.01) |
| B29C 49/42 | (2006.01) |
| B29C 49/06 | (2006.01) |
| B29C 49/10 | (2006.01) |
| B29L 31/00 | (2006.01) |
| B65G 47/86 | (2006.01) |
| B65G 47/244 | (2006.01) |
| B29C 49/02 | (2006.01) |
| B29C 49/28 | (2006.01) |

(52) U.S. Cl.
CPC ...... *B29C 49/062* (2013.01); *B29B 2911/1454* (2013.01); *B29B 2911/14513* (2013.01); *B29C 49/06* (2013.01); *B29C 49/10* (2013.01); *B29C 49/28* (2013.01); *B29C 49/36* (2013.01); *B29C 49/4205* (2013.01); *B29C 2049/024* (2013.01); *B29C 2049/4231* (2013.01); *B29L 2031/712* (2013.01); *B65G 47/2445* (2013.01); *B65G 47/847* (2013.01)

(58) Field of Classification Search
CPC ............ B29C 49/062; B29C 49/4205; B29C 2049/4231; B29C 49/36; B29B 2911/14513; B29B 2911/1454; B65G 47/847; B65G 47/2445
See application file for complete search history.

(56) References Cited

U.S. PATENT DOCUMENTS

| | | |
|---|---|---|
| 5,542,233 A | 8/1996 | Graffin |
| 5,683,729 A | 11/1997 | Valles |
| 6,779,651 B1 | 8/2004 | Linglet et al. |

(Continued)

FOREIGN PATENT DOCUMENTS

| | | | | |
|---|---|---|---|---|
| EP | 0058815 A1 | * | 9/1982 | ......... B29C 49/0073 |
| GB | 2179314 A | * | 3/1987 | ......... B65G 47/2445 |
| WO | 2007101309 A1 | | 9/2007 | |

*Primary Examiner* — Robert B Davis
(74) *Attorney, Agent, or Firm* — Hayes Soloway PC

(57) ABSTRACT

A continuous non-symmetric preform feed stretch-blow-moulding machine dedicated to the stretch-blow-moulding of containers from non-symmetric injection moulded preforms; the non-symmetrical preforms including an integral handle extending from a first junction point to a second junction point on a body of the preform; the body of the preform and the integral handle constituted from the same material.

25 Claims, 27 Drawing Sheets

(56) References Cited

U.S. PATENT DOCUMENTS

| | | | |
|---|---|---|---|
| 8,632,333 B2 | 1/2014 | Holzer et al. | |
| 2006/0099294 A1* | 5/2006 | Netsu | B29C 49/06 |
| | | | 425/540 |
| 2006/0214321 A1* | 9/2006 | Semersky | B29C 49/78 |
| | | | 264/40.1 |
| 2007/0256911 A1* | 11/2007 | Legallais | B65G 47/847 |
| | | | 198/468.3 |
| 2009/0004322 A1* | 1/2009 | Legallais | B29C 49/421 |
| | | | 425/534 |
| 2012/0048683 A1 | 3/2012 | Forsthoevel et al. | |
| 2014/0225315 A1 | 8/2014 | Ogihara | |
| 2015/0044620 A1 | 2/2015 | Beale | |
| 2015/0321413 A1* | 11/2015 | Deau | B29C 49/783 |
| | | | 700/110 |
| 2017/0157833 A1 | 6/2017 | Marastoni et al. | |

* cited by examiner

Section A-A

Section B-B

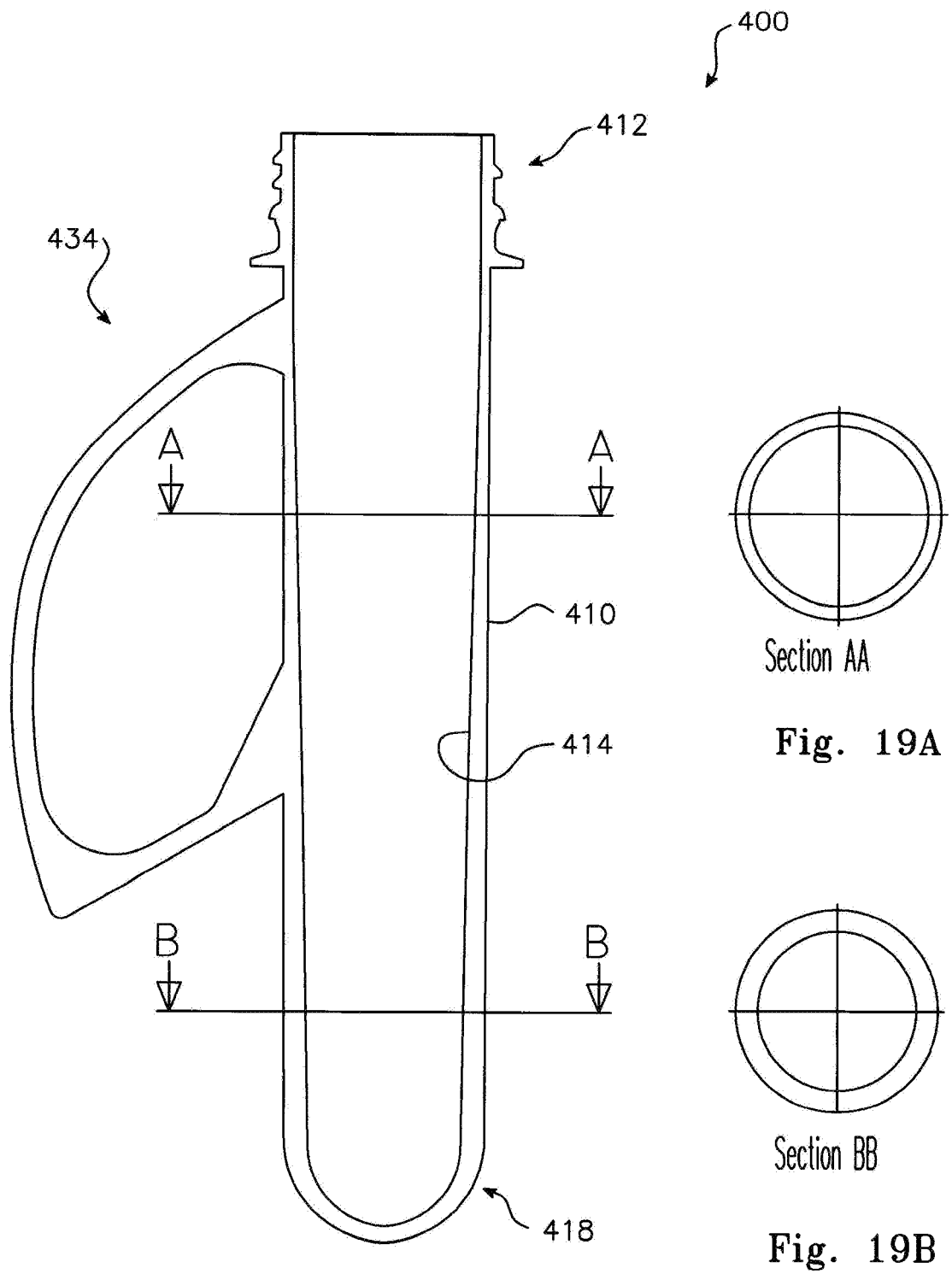
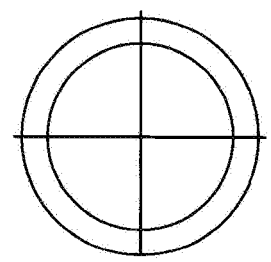
Section AA
Fig. 19A
Section BB
Fig. 19B
Fig. 19

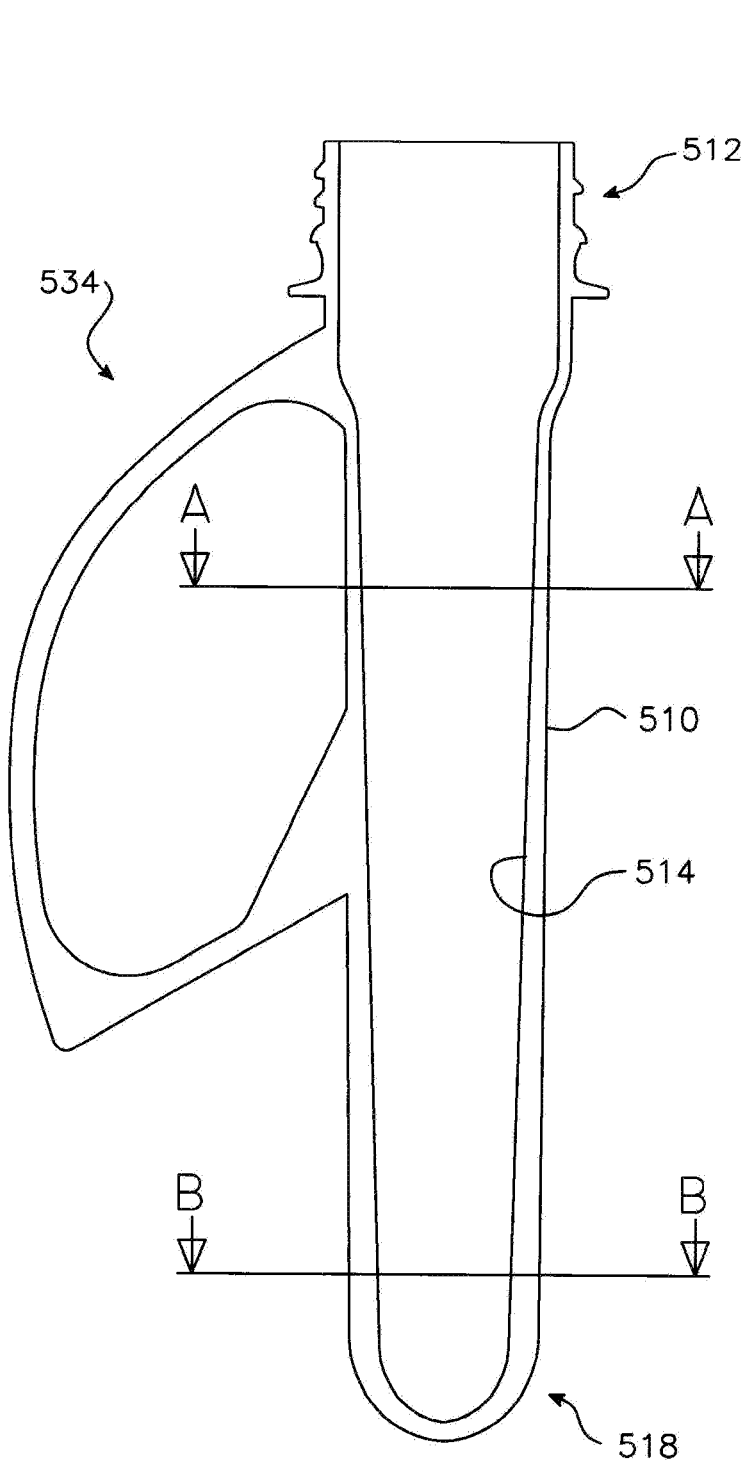
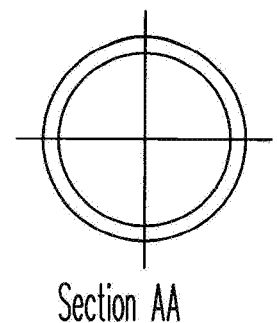
Section AA
Fig. 20A
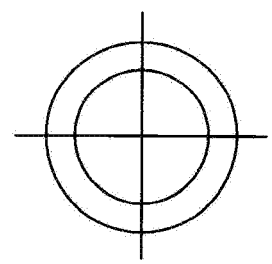
Section BB
Fig. 20B
Fig. 20

Section AA

Section BB

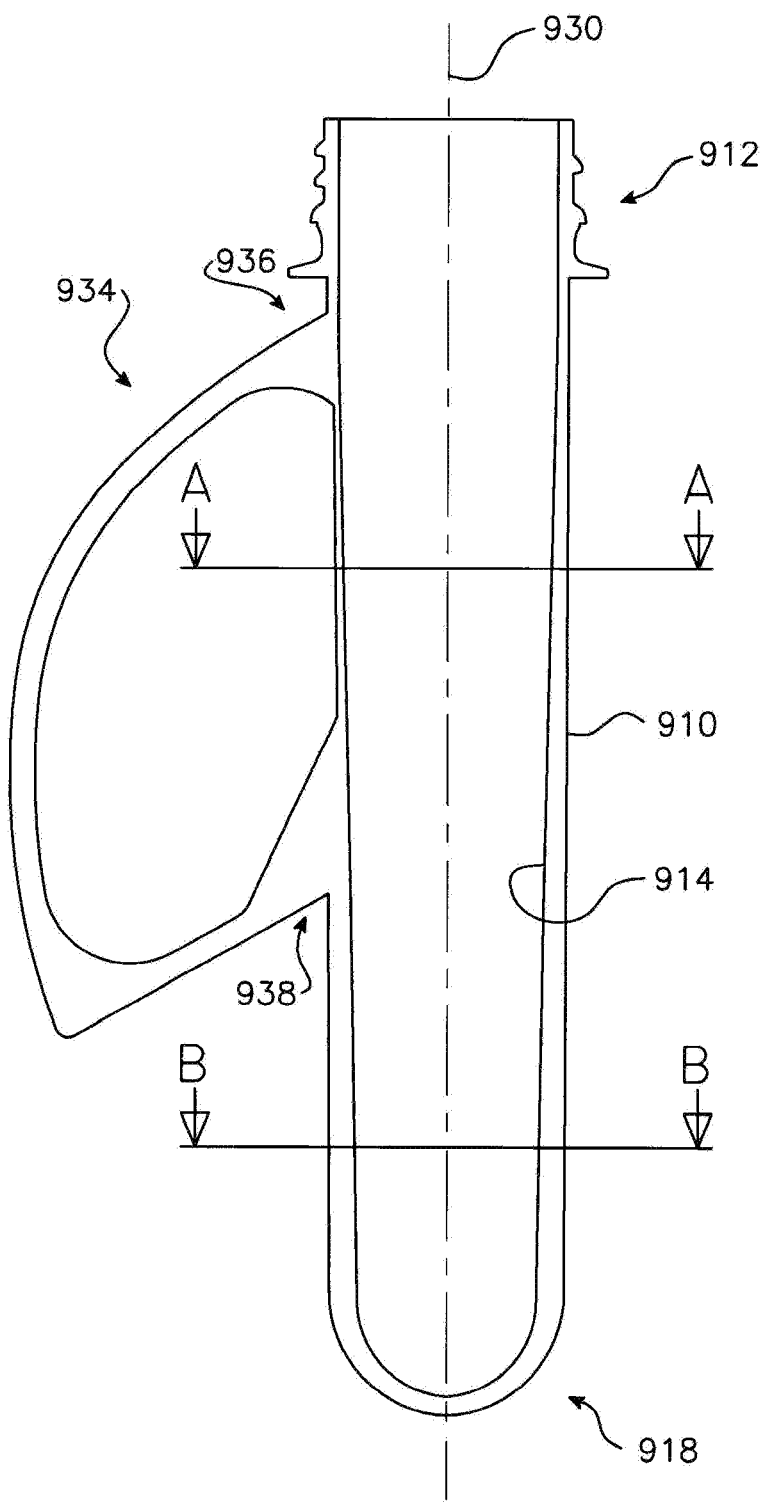
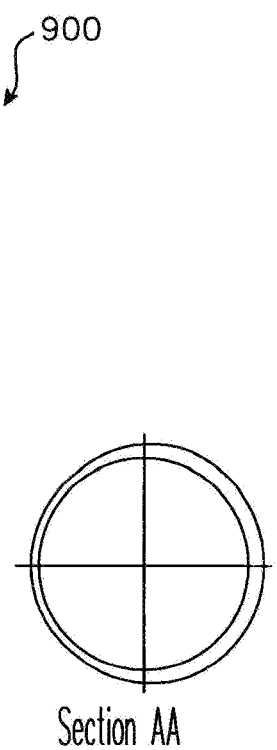
Section AA
Fig. 23A
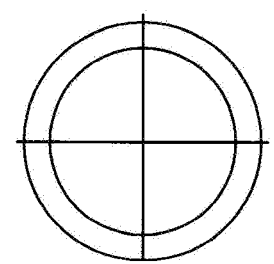
Section BB
Fig. 23B
Fig. 23

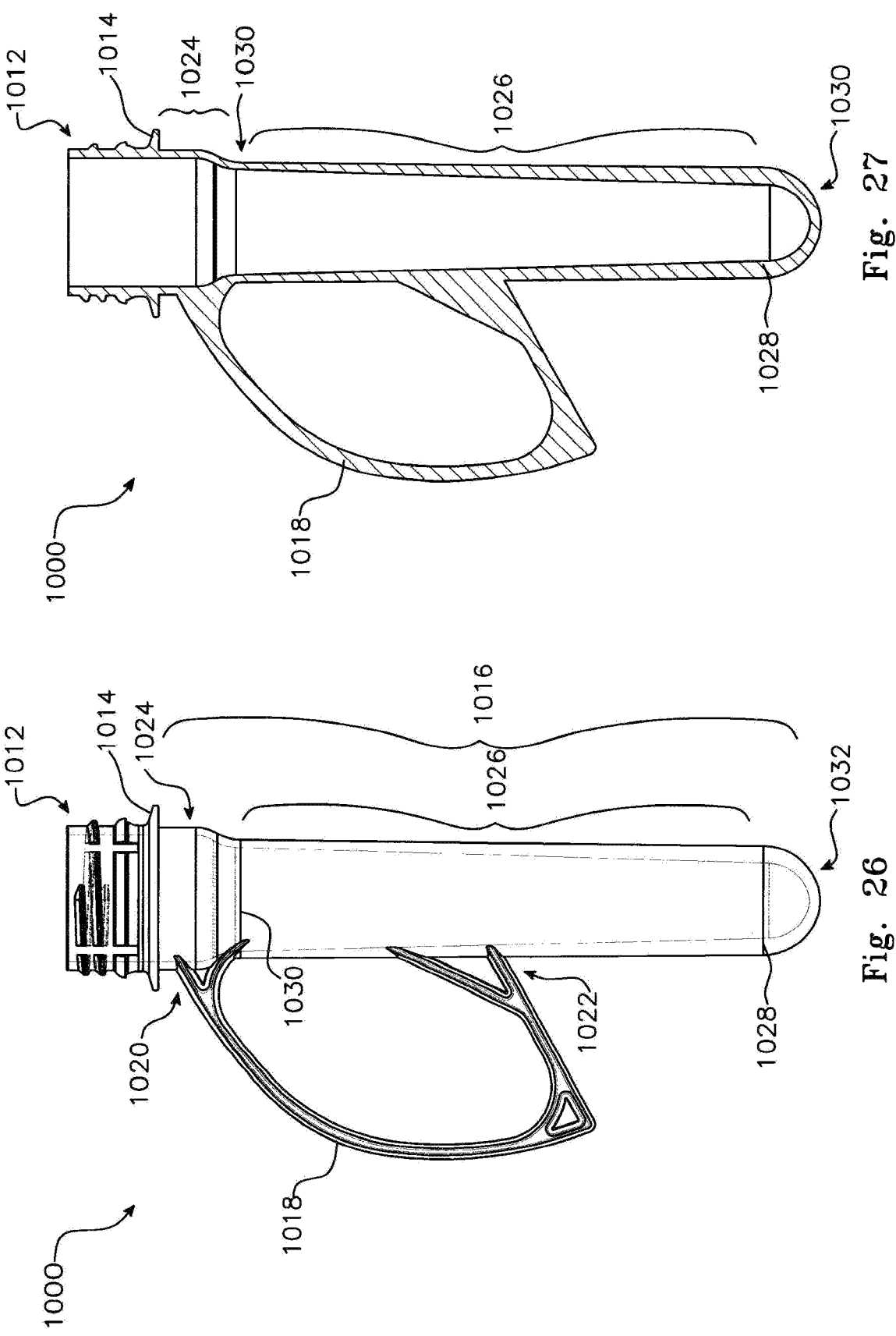

BLOW MOULDING MACHINE, PREFORMS, SYSTEM AND PROCESS

TECHNICAL FIELD

The present invention relates to the equipment and method for the production of stretch-blow-moulded polymer containers from injection-moulded preforms.

BACKGROUND

The process of stretch-blow-moulding polymer containers from a prior injection moulded preform is long established in the art. Generally, preforms, as injection moulded, comprise an elongate cylindrical body portion and a neck. In the stretch blow-moulding process, the preform enters a die, held by the neck which retains its injection moulded shape, and the body is firstly mechanically stretched in at least one direction followed by the injection of air to force the polymer material into the desired shape as defined by the die cavity and also stretching the polymer material in at least one other direction—termed biaxial orientation. Where time has elapsed between the injection moulding of the preforms and their entry into the blow moulding process so that the preforms have cooled to ambient temperature, a preheating process is applied before preforms enter the blow mould die.

The process is considerably more complicated if the preform is rotationally non-symmetric and, as in the present case, is injection moulded with an integrally attached handle, and more particularly if the handle is in the form of a loop, integrally attached at two points on the body of the preform. The complication arises primarily from the need to control the orientation of the handle and to correctly preheat the body of the preform while protecting the handle from excessive heat absorption, as well as the correct insertion of the preform into the stretch-blow-moulding die.

Such a preform and systems for its transformation into a container with integral handle are disclosed in WO2007101309. The entire disclosure of WO2007101309 is incorporated hereby cross reference. In that disclosure, preforms enter a production machine such as schematically shown in FIGS. 55 and 72 of that document after orientation of the handle, which orientation is then maintained, through the preheating stage and into the stretch-blow-moulding die.

In the systems disclosed in WO2007101309 however, the process of production is discontinuous or 'batch'; that is, the production machines progress preforms incrementally, pausing at each index to allow for pick and place loading of preforms, their insertion into a supporting mandrel and the entry into and exit from the stretch blow-moulding cavities, while the preforms are stopped for each moulding cycle. A disadvantage of this incremental processing is that it is clearly less efficient than a continuous process.

The present invention relates to a machine and process for the stretch blow moulding of preforms with an integral handle in a continuous feed, thus non-incrementing system. Because of the several stages in the process, the requirements of establishing handle orientation, the preheating stage and the stretch-blow-moulding stage as well as the removal of finished containers, requires the transfer of preforms between rotating in-feed, preheating, moulding and transport elements of the system. A continuous process makes these processes and transfers for a preform with integral handle, considerably more complex.

A system for handling a non-rotationally symmetric preform requiring a known orientation for selective preheating and prior to loading into a stretch-blow-moulding die was disclosed in U.S. Pat. No. 8,632,333 B2. In the arrangement of this patent orientation is established with reference to a small reference tab or notch, but this preform not having a handle there is no need for orientation relative a heat shield.

It is an object of the present invention to address or at least ameliorate some of the above disadvantages.

Notes

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

SUMMARY OF INVENTION

Definitions

Continuous preform feed: In this specification, continuous preform feed occurs where preforms are advanced at constant velocity from an entry location to an exit location along a path.

Non-symmetric preform: In this specification, a non-symmetric preform is a preform which is not symmetric about its longitudinal axis.

Integral handle preform: In this specification, an integral handle preform is a non-symmetric preform which has a handle portion extending from a body of the preform and wherein the handle is integrally moulded with the body of the preform.

Stretch blow moulding die: In this specification, a stretch blow moulding die comprises an openable cavity adapted to receive a preheated preform for subsequent stretch blow moulding of the preheated preform within the cavity of the die.

Accordingly in one broad form of the invention there is provided a continuous non-symmetric preform feed stretch-blow-moulding machine dedicated to the stretch-blow-moulding of containers from non-symmetric injection moulded preforms; the non-symmetrical preforms including an integral handle extending from a first junction point to a second junction point on a body of the preform; the body of the preform and the integral handle constituted from the same material; the machine including a preform orientation system to orient the handle of the preform into a known orientation at arrival at a pick off position.

Preferably the preforms are in continuous motion from an initial preform pick off point through stretch-blow-moulding into the containers and ejection from the machine as stretch-blow-moulded containers.

Preferably the integral handle retains a shape of the handle as injection moulded through all stages of the stretch-blow-moulding machine to forming a handle on the stretch-blow-moulded container.

Preferably the stages of the stretch-blow-moulding machine include a handle orientation stage; all preforms arriving at the pick off point having the integral handle oriented in a predetermined direction relative to motion of the preform approaching the pick off position.

Preferably the stages of the stretch-blow-moulding machine include a continuously rotating first transfer system transferring preforms from a continuously rotating preform feeder wheel at the preform pick off position to a transfer to preheating position at a continuously rotating preheating stage.

Preferably a first pick and place apparatus of the first transfer system includes a preform grasping gripper; reciprocating rotation and linear displacement of the grasping gripper induced by a combination of a rotating carrier of the pick and place apparatus and two cam loci.

Preferably the rotating carrier is an arm of four radially extending support arms rotating about a common centre of rotation; an outer end of each support arm rotationally supporting a pick and place apparatus.

Preferably the support arms rotate above a fixed cam plate; the cam plate provided with an inboard cam channel for a first locus of the two cam loci and a periphery of the cam plate providing an outer cam surface for a second locus of the two cam loci.

Preferably a housing of a linear guide of the pick and place apparatus is rotationally mounted at the outer end of the supporting arm; an outrigger arm extending from the housing provided with a first cam follower locating in the cam channel.

Preferably a free sliding element of the linear guide is provided with a second cam follower; the second cam follower maintained in contact with the outer cam surface by a spring.

Preferably the grasping gripper of the pick and place apparatus is mounted to a rotary actuator supported from an outer end of the free sliding element; the rotary actuator adapted to rotate fingers of the grasping gripper 180 degrees as a pick and place apparatus transits between the preform pick off position and the transfer to preheating position.

Preferably the continuously rotating preheating stage includes a preform transport system; preform supporting mandrels travelling along a loop rail system; the preform supporting mandrels rotating preforms about a vertical axis of the preforms as preforms travel past banks of heating elements.

Preferably the preform supporting mandrels are provided with a heat shield; the heat shield comprising a channel projecting from a cylindrical collar.

Preferably the pick and place apparatus of the first transfer system brings a vertical axis of a perform into alignment with a vertical axis of the cylindrical collar of a preform supporting mandrel at the transfer to preheating position; the gripper of the pick and place apparatus concurrently manoeuvring the handle of the preform between side elements of the channel of the mandrel.

Preferably the preform is lowered after the neck of the preform is released by the gripper of the pick and place apparatus so that the neck of the preform is located within the cylindrical collar of the mandrel.

Preferably a preheated preform is extracted from a supporting mandrel by a pick and place apparatus of a second transfer system at a transfer from supporting mandrel position; the transfer from supporting mandrel position lying on a line joining respective centres of rotation of a proximate rotating guide wheel of the preheating transport system and the second transfer system.

Preferably the preform extracted from a preform supporting handle by a gripper of the pick and place apparatus of the second transfer system is rotated through 180 degrees by a rotary actuator of the pick and place apparatus as an arm of the second transfer system rotates the pick and place apparatus towards a die loading position.

Preferably a combination of rotation of the arm of the second transfer system and rotation and linear displacement of the gripper induced by the loci of a first and second cam follower of the pick and place apparatus, brings a vertical axis of the preform into alignment with a vertical axis of a stretch-blow-moulding die as both the pick and place apparatus and an opened stretch-blow-moulding die approach the die loading position; movements of the gripper concurrently bringing the handle of the preform into alignment with a line joining respective centres of rotation of the stretch-blow-moulding die and the second transfer system.

Preferably a pick and place apparatus of a third transfer system extracts a stretch-blow-moulded container from the stretch-blow-moulding die as the stretch-blow-moulding die opens at a die unloading position; the die unloading position lying on a line joining respective centres of rotation of the rotating stretch-blow-moulding die and the third transfer system.

Preferably the extracted stretch-blow-moulded containers are rotated from the die unloading position to a rotating outfeed wheel; the rotating outfeed wheel transferring the containers along a discharge channel and a container receiving bin.

In yet a further broad form of the invention there is provided a pick and place apparatus manipulating a non-symmetrical preform; the pick and place apparatus operating in a continuously rotating stretch-blow-moulding machine wherein a preform gripping gripper of the pick and place apparatus is urged into reciprocating rotation and linear displacement by a combination of a rotating support of the pick and place apparatus and two cam loci.

Preferably the reciprocating rotation is about a vertical axis; linear displacement being in a horizontal plane.

In yet a further broad form of the invention there is provided a method of controlling paths of grippers of pick and place apparatuses of rotating transfer systems; the rotating transfer systems operating in a continuous non-symmetric preform feed stretch-blow-moulding machine; the paths of the grippers following respective loci of non-symmetrical preforms as preforms are transferred by the rotating transfer systems from a preform pick off position, inserted into and extracted from a preform support mandrel of a preheating stage and inserted into and extracted as a stretch-blow-moulded containers from rotating stretch-blow-moulding dies; the non-symmetrical preforms comprising a body portion and an integral handle extending from the body portion; the method including the steps of:

rotationally mounting each of the pick and place apparatuses on a rotating arm of a respective rotating transfer system, urging reciprocating rotation of the grippers about respective vertical axes of the pick and place apparatuses controlled by a locus of a first cam follower and the rotation of the rotation of the rotating arm, urging reciprocating horizontal linear displacement controlled by a locus of a second cam follower and the rotation of the rotating arm, and, wherein the locus of the first cam follower is determined by a cam channel of a cam plate; the locus of the second cam follower being determined by an outer cam surface of the cam plate.

Preferably a first rotating transfer system transfers a non-symmetrical preform from a rotating preform feeder wheel to a rotating preform support mandrel of the preform preheating system.

Preferably a second rotating transfer system transfers a non-symmetrical preform from a rotating perform support mandrel into a stretch-blow-moulding die.

Preferably a third rotating transfer system extracts stretch-blow-moulded containers from the stretch-blow-moulding die to a rotating outfeed wheel.

In yet a further broad form of the invention there is provided a method of transferring a non-symmetric preform between stages of a continuous non-symmetric preform feed rotating stretch-blow-moulding machine; the non-symmetric preform being transformed into a stretch-blow-moulded container by a step of stretching and blowing the non-symmetric preform in a cavity of the stretch-blow-moulding die; the method including the steps of:

orienting the non-symmetrical preform so that an integral handle of the preform has a known orientation at arrival at a pick off position in the machine, gripping a neck of the preform in grippers of a pick and place apparatus of a rotating first rotating transfer system and rotating the preform to a preheating stage of the machine, manoeuvring the gripper of the first pick and place apparatus so as to align the integral handle with a heat shield of a moving preform supporting mandrel and aligning an axis of a body of the preform with a neck supporting cylindrical collar of the mandrel, removing the non-symmetric preform from the preform supporting mandrel with a gripper of a second pick and place apparatus of a rotating second rotating transfer system and rotating the preform to a rotating stretch-blow-moulding die of the machine in a second stage, manoeuvring the gripper of the second pick and place apparatus so as to align the integral handle with a handle nesting portion of the stretch-blow-moulding die and a vertical axis of the preform with a vertical axis of the stretch-blow-moulding die in a third stage, manoeuvring grippers of a pick and place apparatus of a rotating third rotating transfer system in position to grasp the neck of a now stretch-blow-moulded container and extracting the stretch-blow-moulded container from the stretch-blow-moulding die in a fourth stage.

Preferably the movement of the grippers of the pick and place apparatus of any one of the first, second or third rotating transfer systems is controlled by a combination of rotation of an arm of the transfer system supporting the pick and place apparatus and rotation and linear displacement controlled by loci of two cam followers.

Preferably the locus of the first cam follower is determined by a cam channel provided in a fixed cam plate of each of the first, second and third rotating transfer systems; the locus of the second cam follower determined by an outer cam surface of the fixed cam plates.

In yet a further broad form of the invention there is provided a method of manipulating a non-symmetrical injection moulded preform into a stretch-blow-moulding die of a continuous preform feed stretch-blow-moulding machine; the method including the steps of:

extracting a preform from a preform preheating stage with a pick and place apparatus of a continuously rotating transfer system such that an integral handle of the preform has a predetermined orientation, and wherein manoeuvring of a preform supporting gripper of the pick and place apparatus is controlled by rotation of an arm of the transfer system in combination with rotation and linear extension of the gripper guided by loci of two cam followers.

Preferably the method includes the further steps of:

manoeuvring the pick and place apparatus to align the integral handle with a bisecting radial line of an open stretch-blow-moulding die as the bisecting radial line rotates into coincidence with a line extending between rotation centres of the stretch-blow-moulding machine and the transfer system, further manoeuvring the pick and place apparatus to align a vertical axis of a body of the preform with an axis of the die and the handle of the preform with a handle nesting portion of the die when opposing halves of the die close on reaching the line between rotation centres, In yet a further broad form of the invention there is provided a method of preventing distortion of an integral handle of a preform in a stretch-blow-moulding process in a continuous preform feed stretch-blow-moulding machine; the method including the steps of:

preparing each half of a stretch-blow-moulding die with a handle nesting cavity conforming to at least a portion of the integral handle of the preform, manipulating the preform so that the handle is brought into coincidence with the handle nesting cavity as two halves of the stretch-blow-moulding die close on the preform.

Preferably the manipulation of the preform is by a pick and place apparatus; a gripper of the pick and place apparatus urged into rotational and linear motion by a combination of rotation of an arm of a preform transfer system to which the pick and place is mounted, and rotation and linear displacement controlled by two cam loci.

In yet a further broad form of the invention there is provided a method of controllably heating a pre-form to a die introduction temperature; the pre-form having a neck portion extending from a body portion; said pre-form further having a handle portion extending radially; said method comprising controllably transferring an integral handle PET pre-form onto a continuously moving conveyor;

securing the preform by its neck portion to the conveyor whereby the preform is transported by the conveyor at substantially constant velocity along a reheating path from a pre-form entry location to a pre-form exit location;

at least portions of the pre-form controllably heated to the die introduction temperature by the time it reaches the pre-form exit location;

a controllable heater array distributed along the path arranged to direct heat to selected portions of the pre-form;

the pre-form controllably transferred from the preform exit location into a die for stretch blow moulding of the pre-form thereby to form a blown container.

Preferably the handle portion is solid and has a first end and a second end; the first end integrally connected at a first, upper location to the pre-form; the second end integrally connected at a second, lower location to the pre-form.

Preferably the first, upper location is located on the body portion.

Preferably the first, upper location is located on the neck portion.

Preferably the second, lower location is located on the body portion.

Preferably the elements are arranged in modules; the modules arrayed around the continuously rotating preform conveyer; the elements controlled as a group based on height wherein the top most elements of the modules are controlled to a predetermined temperature together whilst the next down in height elements are also controlled together to a predetermined temperature—and so on down to elements at the lowest level.

Preferably a processor controls the speed of rotation of a motor in order to control the continuous speed of advancement of the preforms.

Preferably a temperature sensor provides environment temperature sensing which is utilised by processor to modulate the degree of heating of all elements by a difference factor delta ($\Delta$).

In yet a further broad form of the invention there is provided an orientation mechanism controlling orientation of a non-symmetric injection moulded preforms prior to entry into stages of a stretch blow-moulding machine; the non-symmetric preforms each including an integral handle extending from a first junction point below a neck of the preform and a second junction point on a body of the preform; the mechanism including a pair of contra-rotating drive wheels disposed along opposite sides of inclined rails; one of the drive wheels inducing rotation of the body of the preform moving down the inclined rails to rotate the handle of the preform into a preferred position.

Preferably the inclined rails include a pair of upper rails between the preforms are suspended by necks of the preform and a pair of lower rails which constrain the integral handles into approximate alignment with a long axis of the inclined rails; integral handles of the preforms constrained to either a leading or a trailing orientation.

Preferably the pair of drive wheels are located at a level coincident with a lower portion of the body of the preform below the lower rails and a lowest point of the integral handles; axes of the drive wheels normal to the long axis of the inclined rails.

Preferably a gap between the pair of drive wheels is smaller than a diameter of the body of the preform; each guide wheel including at least one tyre of a sufficiently soft polymer material to allow passage of the body of the preform through the gap between the pair of drive wheels.

Preferably directions of rotation of the pair of contra-rotating drive wheels draw preforms moving down the inclined rails through the gap between the drive wheels; a first of the drive wheels rotating in an anticlockwise direction with a second opposite drive wheel rotating in a clockwise direction.

Preferably the drive wheels rotate at different rates of rotation; the ratio of rotation of the first drive wheel to the rotation of the second opposite drive wheel being of the order of 2:1.

Preferably the different rates of rotation of the drive wheels cause the second opposite drive wheel to rotate the body of the preform in an anticlockwise direction as the preform passes through the gap between the two drive wheels.

Preferably rotation of the body of the preform changes orientation of a preform with a leading handle at entry to the mechanism to a preform with a trailing handle on exit from the mechanism; a gap in the lower rail at the side of the lower rail adjacent the first drive wheel.

In yet a further broad form of the invention there is provided a method of orienting a non-symmetrical preform for entry to stages of a stretch blow-moulding machine; the none symmetrical preform including an integral handle extending from a first junction point below a neck of the preform to a second junction point on the body of the preform; the method including the steps of:

providing preforms to slide down inclined rails towards an orientation mechanism while supported by the necks of the preforms along upper rails of the inclined rails, constraining integral handles of the preforms in either a leading or in a trailing position between lower rails of the inclined rails, drawing preforms through a gap between a pair of contra rotating drive wheels of the orientation mechanism disposed along the inclined rails, and wherein differential rates of rotation of the pair of drive wheels rotate the body of the preform from a leading orientation of the integral handle at entry to the orientation mechanism into trailing orientation of the handle at exit of the preform from the orientation mechanism.

Preferably the pair of drive wheels are located coincident with a lowermost portion of the body of the preform below lower rails of the inclined rails and below a lowermost point of the integral handle.

Preferably a first of the pair of contra rotating guide wheels at one side of the inclined rails rotates in an anticlockwise direction; the second of the pair of contra rotating drive wheels at an opposite side of the inclined rails rotating in a clockwise direction; the pair of contra rotating drive wheels acting to draw preforms through the gap between the drive wheels.

Preferably the ratio of the rate of rotation of the contra rotating drive wheel to the rate of rotation of the clockwise rotating drive wheel is in the order of 2:1.

Preferably the clockwise rotation of the clockwise rotating drive wheel rotates bodies of a preforms passing through the gap between the drive wheels in an anticlockwise direction such that a preform with an integral handle in a leading orientation is rotated so that the integral handle is in a trailing orientation.

In another broad form of the invention, there is provided an injection-moulded preform forming a stretch-blow-moulded container; the preform comprising an open neck portion and a hollow body extending from the neck portion; the preform further including an integrally injection-moulded handle; at least a portion of walls of the hollow body varying in thicknesses.

Preferably, at least a portion of an inner surface of the hollow body is non-concentric with outer surfaces of the hollow body.

Preferably, the outer surfaces of the hollow body are defined by diameters centred on a central longitudinal axis of the preform to form a substantially cylindrical body.

Preferably, the cross sections of the at least a portion of the inner surface of the hollow body are ovoid in section.

Preferably, the centres of the cross sections of ovoid shape are centred on the central longitudinal axis of the preform.

Preferably, the centres of the cross sections of ovoid shaper are offset from the longitudinal axes of the preform.

Preferably, the centres of circular cross sections of a portion of the hollow body are offset from a central longitudinal axis of the hollow body.

Preferably, a core or mandrel forming the inner surface of the hollow body in an injection moulding step, comprises at least one portion of circular cross sections to form an upper region of the inner surface of the preform; portion of the mandrel comprising ovoid cross sections depending from a transition portion between a lower end of the at least one portion of circular cross sections and the portion of ovoid cross sections.

Preferably, the mandrel comprises two portions of circular cross sections; an upper portion and a lower portion; the transition portion depending from the lower portion.

Preferably, the upper portion is of diameters equal to inner diameters of the neck portion of the preform.

Preferably, the lower portion is of diameters smaller than the diameters of the upper portion.

Preferably, the transition portion forms an asymmetrical frustum of a cone; an upper end of the transition portion having a diameter equal to that of a lower end of the lower portion with the lower end of the transition portion conforming in cross section to the ovoid cross section of an upper end of the ovoid portion.

Preferably, each of the upper portions and the ovoid portion are tapering; the cross sections decreasing in area from respective maximum areas at upper ends of the portions to minimum areas at the respective lower ends.

Preferably, the diameters defining the outer surface of the hollow body decrease in dimension from a maximum diameter at a lower end of the neck portion to the lower end of the hollow body.

Preferably, the preform includes an integral handle; the handle forming a loop of material extending vertically below the neck portion of the preform to a lower junction on the body of the preform.

Preferably, a central vertical plane of the handle passes through the central axis of the preform.

Preferably, the major axes of the cross sections of the ovoid portion of inner surface of the hollow body of the preform lie in the central vertical plane.

Preferably, the wall thicknesses of the preform in that portion of the preform in which the inner surfaces are defined by the ovoid cross sections, vary from a maximum at opposite ends of the minor axes of the ovoid cross sections to minimum thicknesses at outer ends of the major axes.

Preferably, the ratio of maximum wall thickness to minimum wall thickness of the ovoid portion lies in the range of 2:1 and 2.2:1.

Preferably, the polymer walls of the preform proximate maximum thickness are distributed predominantly to longer side walls of a rectangular cross section blown container; the polymer walls of the preform proximate minimum thickness predominantly distributed to shorter side walls of the blown container.

In another broad form of the invention, there is provided a method of optimizing wall thickness in a stretch-blow-moulded container; the method including the steps of:
  injection moulding hollow preforms in which at least a lower portion of each preform has internal cross sections non-concentric with external surfaces of the lower portion, bringing the preforms to a temperature suitable for stretch-blow-moulding, inserting the preforms into cavities of a stretch-blow-moulding machine, mechanically stretching the preforms and injecting air to form the container.

Preferably, the mandrels for the injection moulding of the preforms include at least one upper region of circular cross sections.

Preferably, the lower portion of the preform has cross sections of an ovoid form.

Preferably, the upper region of the mandrel includes an upper portion and a lower portion.

Preferably, a transition portion extends between a lower end of the lower portion and an upper end of the lower section.

Preferably, the external surfaces of the preform are defined by diameters centred on a central longitudinal axis of the preform.

Preferably, an integral handle is formed on the preform extending in a loop between a first junction region below a neck portion of the preform and a second junction region on a body of the preform; a central vertical plane of the integral handle coincident with the central longitudinal axis.

Preferably, the major axes of the cross sections of ovoid form of the lower section lie in the central vertical plane.

Preferably, the wall thicknesses of the preform in the lower section vary from maximum thicknesses at opposite ends of the minor axes of the ovoid cross sections to minimum thicknesses at opposite ends of the major axes.

Preferably, in stretch-blow-moulding a container of generally rectangular cross section, polymer material proximate the maximum thicknesses is distributed to longer sides of the container and polymer material proximate the minimum thicknesses is distributed to shorter sides of the container.

In another broad form of the invention, there is provided a mandrel for forming internal surfaces of an injection-moulded hollow preform; the mandrel including at least one portion with cross sections which are non-concentric with diameters defining outer surfaces of the preform.

Preferably, the non-concentric cross sections are ovoid in form; the ovoid forms defining varying wall thickness of the preform.

Preferably, the major axes of the ovoid formed cross sections lie in a vertical plane containing a vertical central longitudinal axis of the preform; the vertical plane forming a mid plane of an integral handle formed on the preform depending vertically from a first junction region below a neck portion of the preform to a second junction point on a body of the preform.

In another broad form of the invention, there is provided a method of biasing distribution of polymer material from walls of at least one portion of a preform to selected side walls of a container stretch-blow-moulded from the preform; the method including the steps of:
  arranging a mandrel defining inside surfaces of the preform with cross sections of the at least one portion which are non-concentric with corresponding outer surfaces of the preform as defined by a cavity of a preform injection moulding die, arranging the mandrel in the injection moulding die such that major axes of the cross sections of the mandrel of the at least one portion are aligned with a central vertical plane of the cavity,
  injection moulding the preform,
  introducing the preform into a cavity of a stretch-blow-moulding machine such that the central vertical plane of the preform is aligned with a central vertical plane of a blown container of generally rectangular cross section, and wherein the central vertical plane of the container is parallel to opposing longer sides of the container.

Preferably, the cross sections of the mandrel in the at least one portion are ovoid in shape; major axes of the ovoid cross sections aligned with the central vertical plane; centres of the ovoid cross sections coincident with a central axis of a body of the preform.

Preferably, the outer surfaces of the body of the preform are defined by diameters centred on the central axis.

Preferably, the preform includes an integral handle forming an integral handle on the container; the integral handle of the preform extending vertically from a first junction below a neck portion of the preform to a second junction on a body of the preform; the integral handle centred on the central vertical plane of the preform.

Preferably, in a blow moulding stage polymer material of walls of the preform in the at least one portion and on opposing ends of a minor axes of the ovoid cross sections are biased to the opposing longer sides of the container; polymer material proximate to opposite ends of a major axes of the ovoid cross sections biased towards the shorter side walls of the container.

In another broad form of the invention, there is provided a method of injection moulding a preform in which at least a portion of wall thicknesses of a hollow body of the preform varies along a length of the hollow body; the method including the steps of;

forming at least one pair of opposing cavities in an injection moulding die; the cavities defining external surfaces of the preform and an integral handle, locating a mandrel in each of the at least one opposing cavities such that a central longitudinal axis of the mandrel is coincident with an axis of the cavity as defined by a neck portion of the hollow body, closing the injection moulding die to form a cavity about the mandrel, injecting a polymer into the cavity to form the preform, and wherein the injection-moulded preform includes an integral, injection-moulded handle; the handle extending as a loop from a first junction point below a neck portion of the preform to a second junction point on the hollow body of the preform.

Preferably, the wall thicknesses of the hollow body of the perform increase from below the neck portion to proximate a lower end of the preform.

Preferably, the cross sections of internal surfaces of the perform are concentric with cross sections of external surfaces of the preform.

Preferably, at least a portion of cross sections of internal surfaces of the preform are non-concentric with cross sections of outer surfaces of the preform.

Preferably, the non-concentricity of the cross sections of internal surfaces of the preform with cross sections of the outer surface of the preform is from a portion of cross sections of the internal surface being of ovoid form.

Preferably, the non-concentricity of the internal surfaces with the outer surface of the hollow body is from centres of cross sections of the internal surface being of offset from a central longitudinal axis of the preform.

In a further broad form of the invention, there is provided a preform and a container stretch-blow-moulded from the preform in a stretch-blow-moulding machine; the preform comprising a neck portion, a collar below the neck portion and a body extending from below the collar; the body including a first cylindrical portion having a first diameter and a second conical portion tapering from a diameter smaller than the diameter of the first portion to a minimum diameter proximate a bottom portion of the preform.

Preferably, the preform includes an integral handle forming a loop extending from a first junction position proximate the collar to a second junction position along the body.

Preferably, the first cylindrical portion extends from below the collar; the first portion being of a substantially constant diameter.

Preferably, wall thickness of the second conical portion tapers from a minimum thickness proximate the first cylindrical portion to a maximum thickness proximate a tangent line between the conical portion and a bottom portion of the preform.

In a further broad form of the invention, there is provided a method of reducing material required to form a container stretch-blow-moulded from a preform; the preform comprising a neck portion, a collar below the neck portion and a generally cylindrical body below the neck portion; the preform further including a handle extending from a first junction position below the collar to a second junction position along the body of the preform; the method including the steps of:

Forming the body of the preform in at least two portions of different configuration; a first cylindrical portion and a second conical portion;

Reducing a base diameter of the conical portion relative to a diameter of the first cylindrical portion.

Preferably, wall thickness of the second portion varies from a minimum thickness proximate the base diameter of the conical portion to a maximum thickness proximate a tangent line between the second conical portion and a bottom portion of the preform.

BRIEF DESCRIPTION OF DRAWINGS

Embodiments of the present invention will now be described with reference to the accompanying drawings wherein:

FIG. 19 is a sectioned side view of a further preferred embodiment of a preform according to the invention;

FIGS. 19A and 19B are selected cross sections of the preform of FIG. 19;

FIG. 20 is a sectioned side view of a further preferred embodiment of a preform according to the invention;

FIGS. 20A and 20B are selected cross sections of the preform of FIG. 20;

FIG. 23 is a sectioned side view of a further preferred embodiment of a preform according to the invention;

FIGS. 23A and 23B are selected cross sections of the preform of FIG. 23;

FIG. 26 is a preform of reduced PET volume according to a preferred embodiment of the invention, FIG. 27 is a cross section view of the body of the preform of FIG. 26 showing variations in wall thickness.

DESCRIPTION OF EMBODIMENTS

Figure 1:
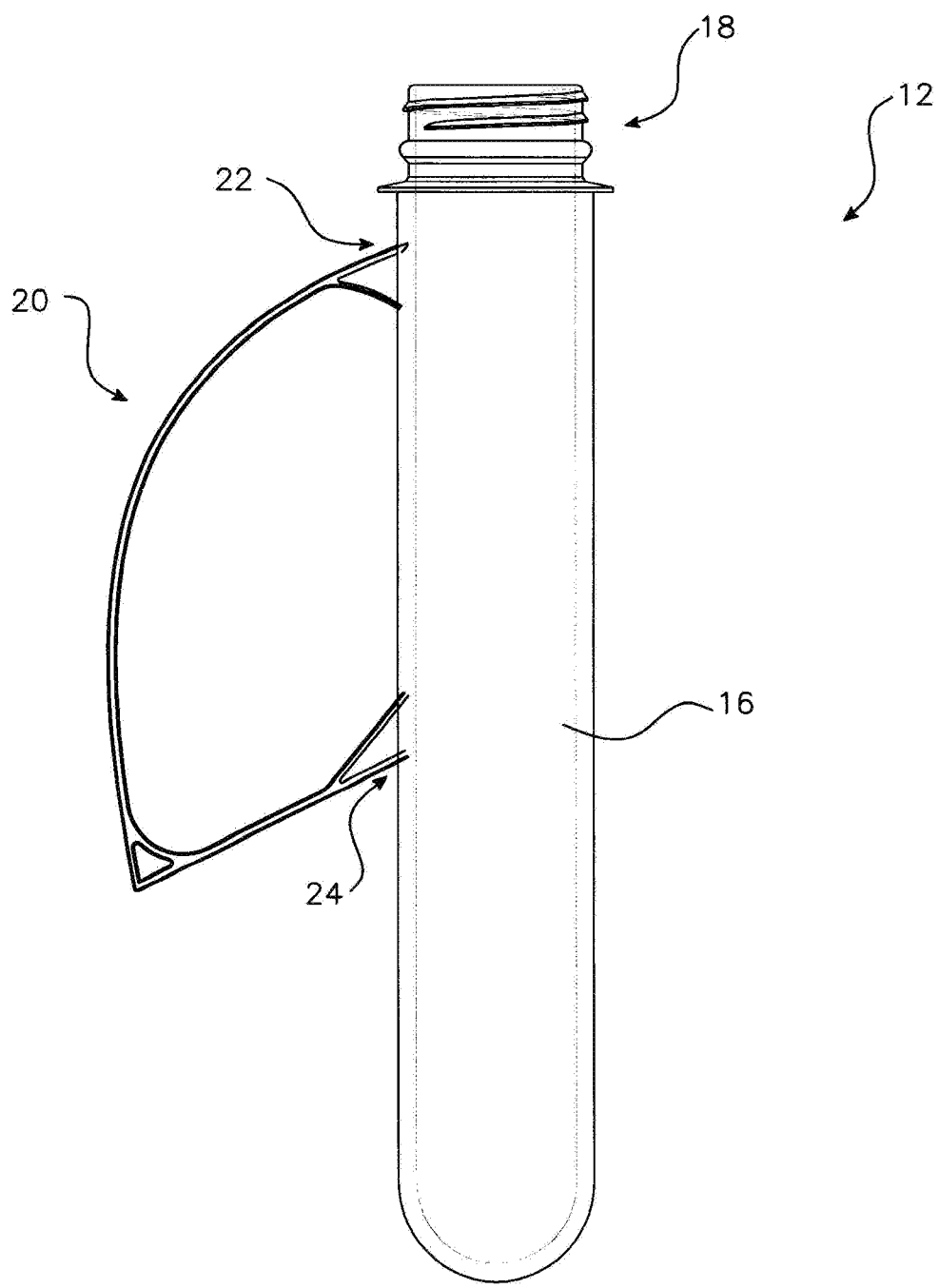
FIG. 1 is a side view of a perform with integral handle for stretch blow-moulding a container by means of a continuous blow moulding machine.
Figure 2:
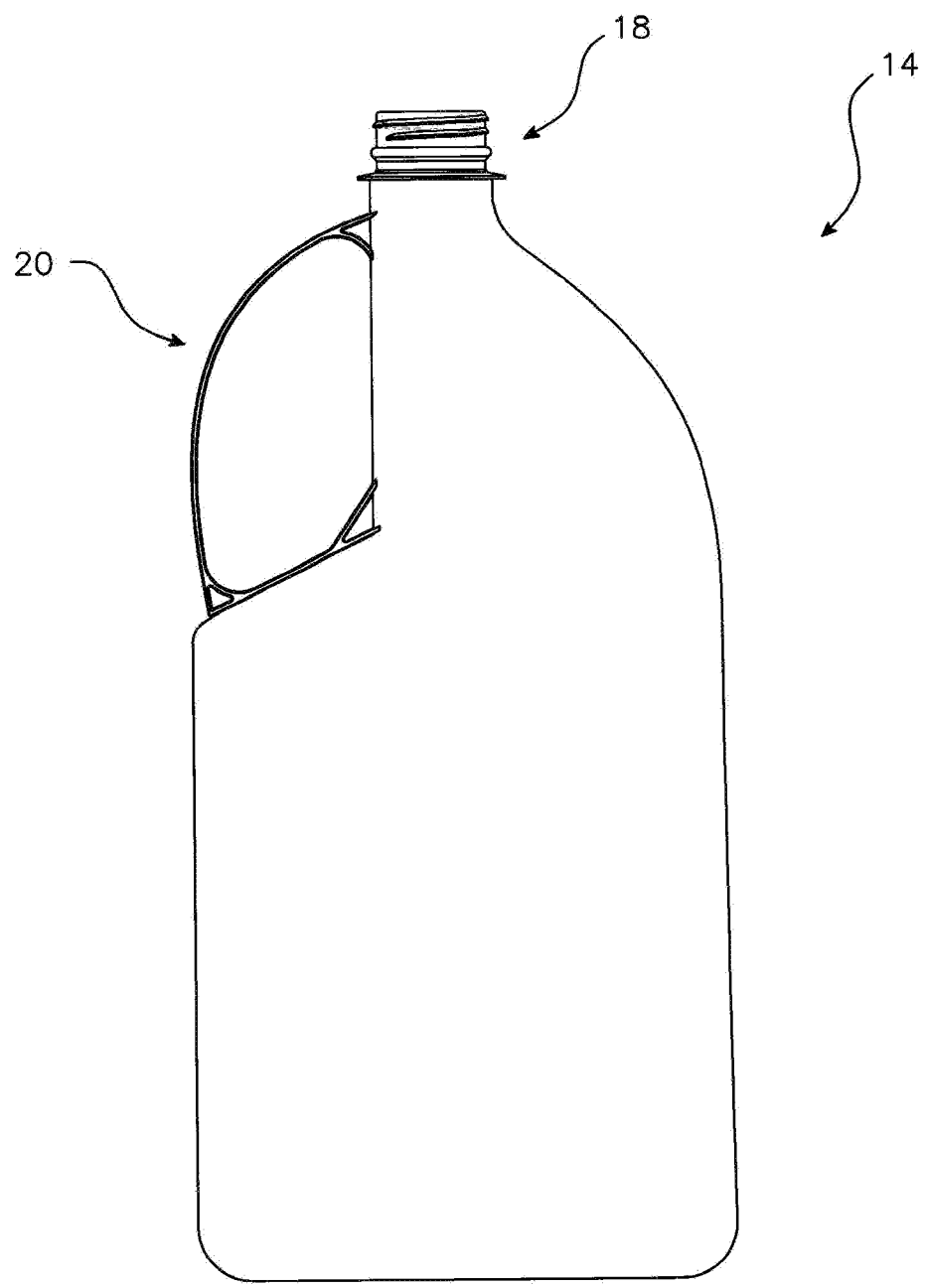
FIG. 2 is a side view of a container with integral handle stretch blow-moulded from the preform of FIG. 1.
Figure 3:
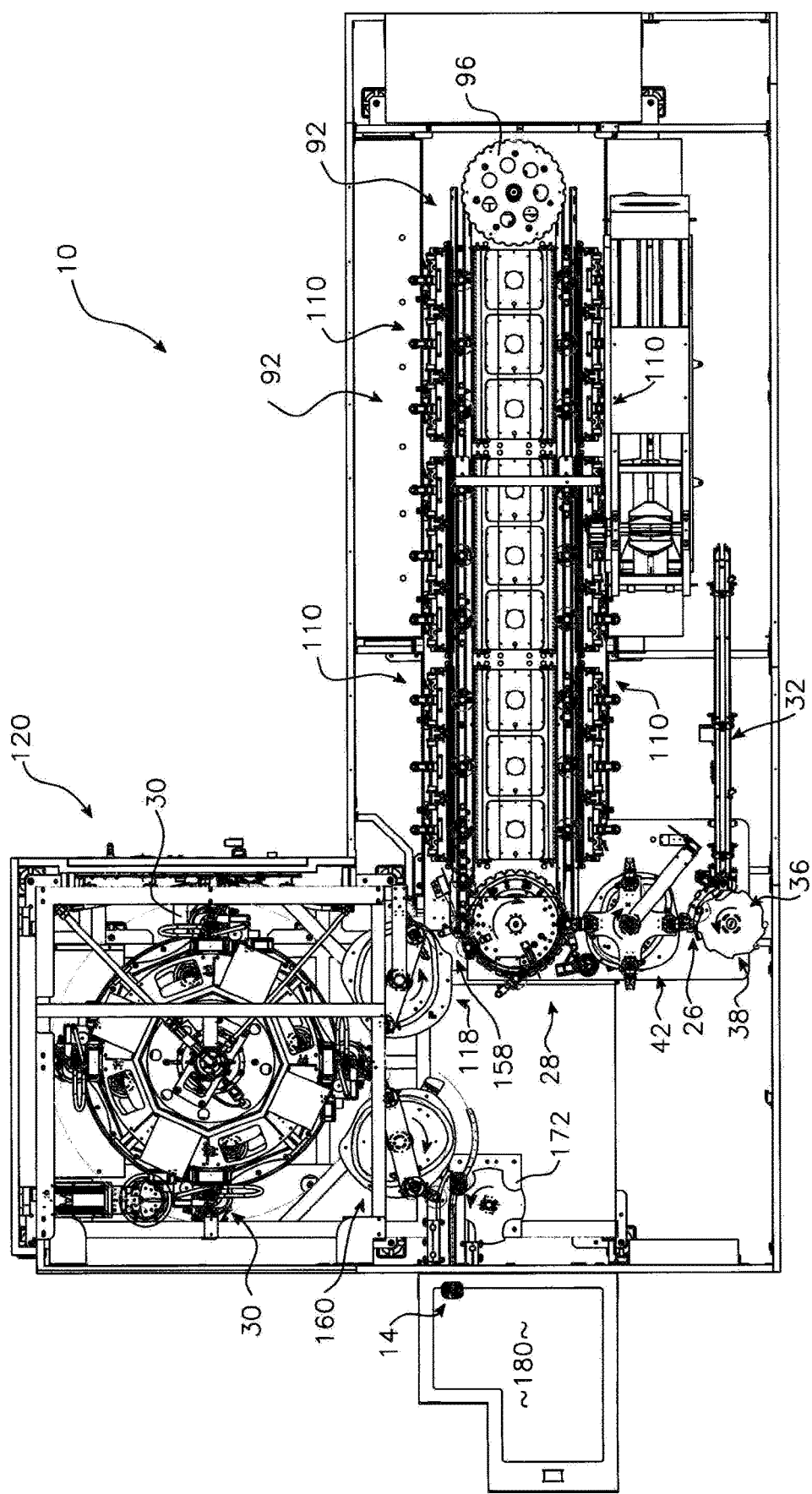
FIG. 3 is a plan view of the stretch blow-moulding machine producing the container of FIG. 2.

A feature of the present machine 10, a preferred configuration of which is shown in FIG. 3, is that motion through the machine of a non-symmetric injection moulded preform 12 as shown in FIG. 1, from its initial intake to its emergence as a stretch blow-moulded container 14 (as shown in FIG. 2), is continuous. As shown in FIG. 1, the previously injection moulded polymer preform comprises a cylindrical elongate body 16 and neck 18. An integral handle 20 extends from a first junction point 22 just below the neck 18 to a second junction point 24 on the body 16 of the preform.

Referring again to FIG. 3, the continuous, non-incrementing process of the machine 10 includes the transfer of preforms from a loading or pick off position 26 to a preheating stage 28, through the preheating stage and transfer to a stretch-blow moulding die 30 with subsequent removal of the blown container 14 from the die and removal from the machine. These stages will now be described in detail.

Entry of Preforms and Handle Orientation—First Preferred Embodiment

Figure 4:
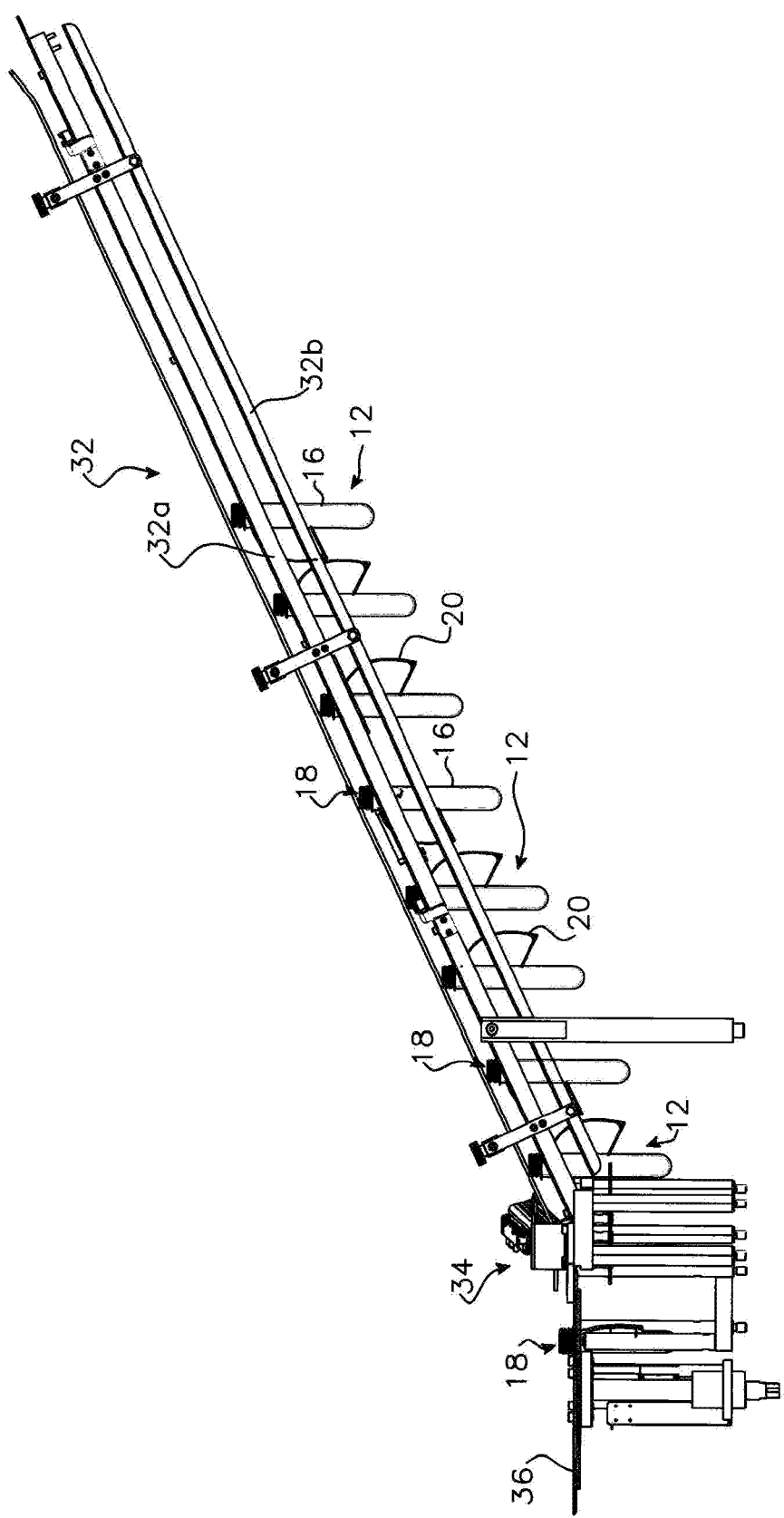
FIG. 4 is a side view of a preform orientation and loading section of the machine of FIG. 3.
Figure 5:
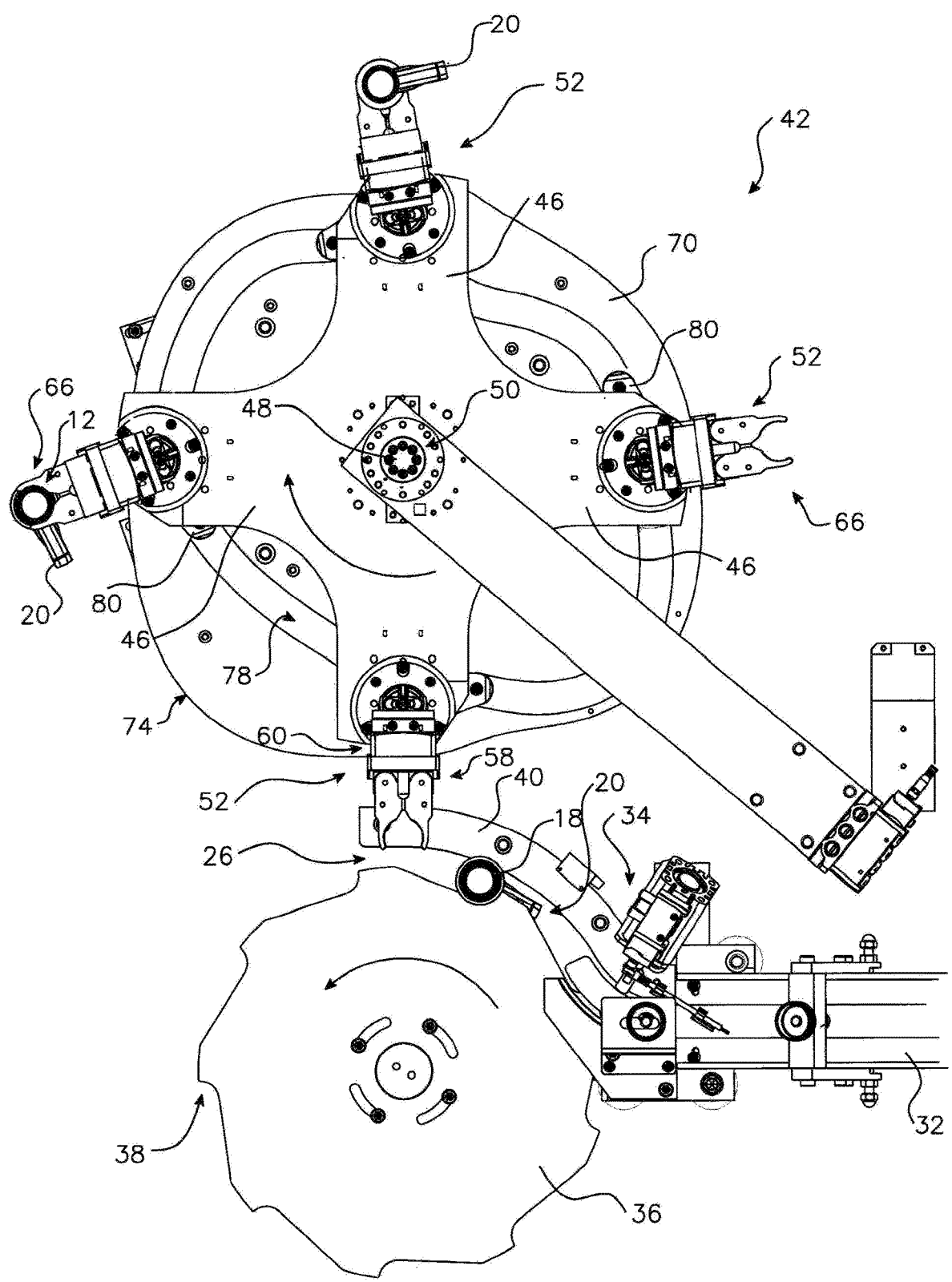
FIG. 5 is a plan view of a loading end of the preform orientation and loading section of FIG. 4 and a first preform transfer system.

As shown in the preferred layout of the machine 10 in FIG. 3 and referring also to FIGS. 4 and 5, the previously injection moulded preforms 12 (as shown in FIG. 1) are fed, for example from a hopper (not shown but as well understood in the industry) to slide under gravity down inclined rails 32 while supported by their necks 18. The inclined rails 32 comprise a pair of upper rails 32a between which the preforms are suspended by their necks 18, and a pair of lower rails 32b which constrain the handles 20 of the preforms approximately in line with the long axis of the rails. For reasons that will become clear, it is essential however, that during the passage of preforms through the stages of the machine, the orientation of the integral handle 20 of the preform is controlled precisely.

Preforms 12 with a handle roughly oriented pass one by one through an escapement 34 to be captured by a continuously rotating feeder wheel 36 which carries the preform between the feeder wheel and a short rail 40, in such a way that friction between the body 16 of the preform and the rail 40 induces rotation of the preform and its handle. The rotating handle collides with a stop 40a under the rail 40 forcing each handle into a rearward orientation with respect to the direction of travel, to arrive at a pick off position 26.

At the instance that a preform arrives at the pick of position 26, a pair of opposing actuators (not shown) located under the pick off position 26, simultaneously briefly close on, and then release, the preform handle 20 to fix its orientation relative the gripper 58 which, also at that instant engages with the neck 18 of the preform.

Entry of Preforms and Handle Orientation—Second Preferred Embodiment

Figure 4A:
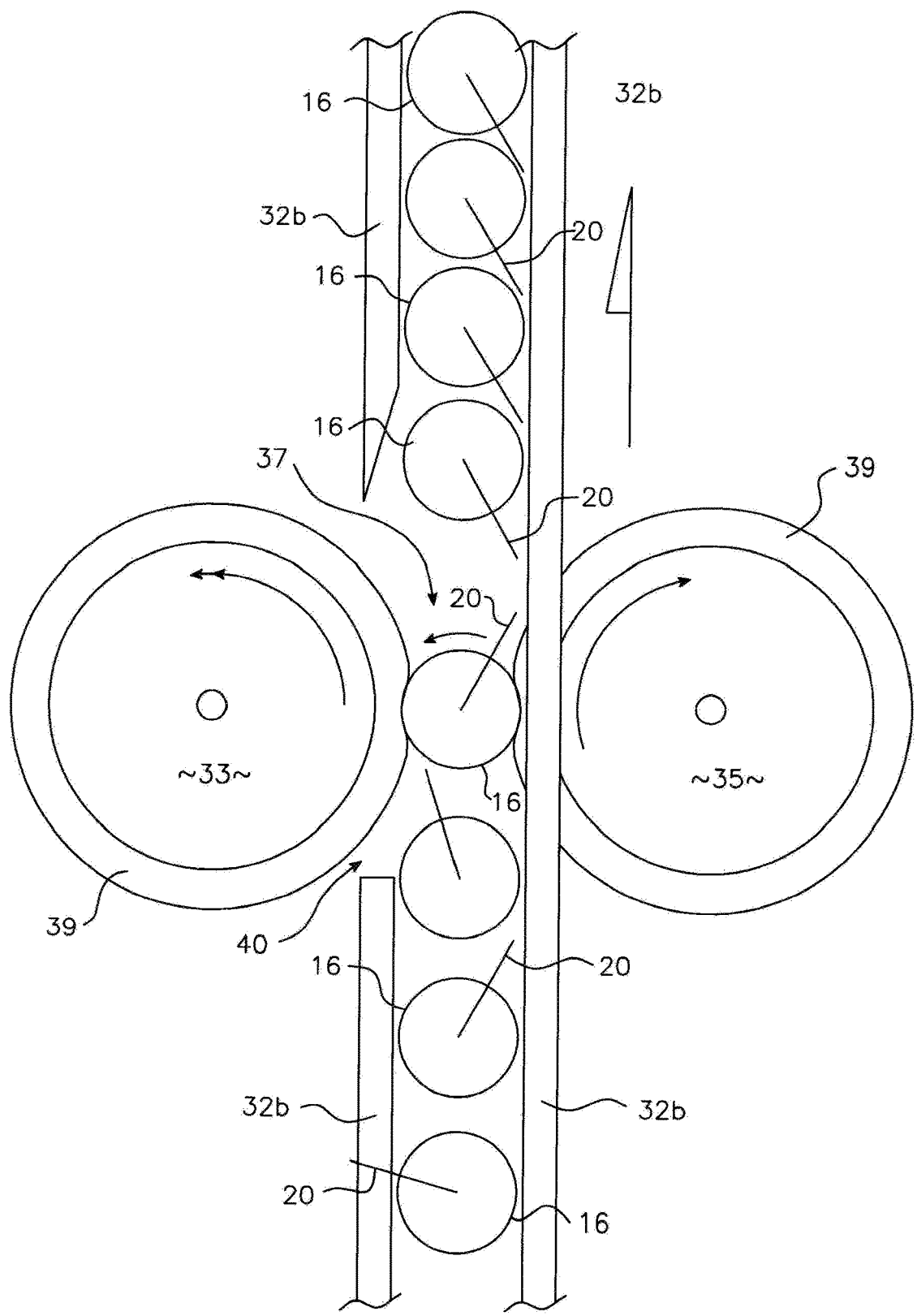
FIG. 4A is a plan view of the preform orientation and loading section of the machine of FIG. 3.

In this second preferred embodiment, with reference now to FIG. 4A, the injection moulded preforms 12 are again fed onto inclined rails 32a, down which they slide under gravity supported by the flanges at the necks 18. Again, as described for the first preferred embodiment above, the handles are loosely constrained between lower rails 32b, with the handles either in a "leading", that is pointing in the direction of movement of the preforms as they progress down the incline, or "trailing", pointing rearwardly.

In this second preferred embodiment an orientation mechanism 34A is located at a point along the rails 32 approaching the lower end of the rails. As can be seen in FIG. 4A, the mechanism includes two contra-rotating drive wheels 33 and 35, arranged at opposite sides of the rails 32, at a level coincident with the lowermost portion of the bodies of the preforms and below the lower rails 32b and the lowermost point of the handles. The axes of the wheels are normal to the slope of the inclined rails. Note only the lower rails 32b are shown in FIG. 4A.

The drive wheels 33 and 35 are separated by a gap 37 which is somewhat narrower than the diameter of the body 16 of the preforms. Each of the wheels 33 and 35 is provided with one or two tyres 39 of a sufficiently soft polymer material to allow a preform body 16 to pass through the gap but providing a degree of grip on the body.

As shown in FIG. 4A, drive wheel 33 rotates in an anticlockwise direction while drive wheel 35 rotates in a clockwise direction. The combination of these two rotations has the effect of drawing a preform through the gap 37. The two drive wheels do not however rotate at the same rate, with, in the preferred arrangement shown in FIG. 4A, drive wheel 35 rotating at a significantly lower rpm than that of guide wheel 33. A preferred ratio of rotation of drive wheel 33 to drive wheel 35 is of the order of 2:1.

The effect of this differential in rate of rotation of the two drive wheels is that drive wheel 35 exerts a considerably greater grip on the body 16 of the preform so that it acts to rotate the preform in an anticlockwise direction as the preform passes through the gap 37 between the two drive wheels. By this means a handle 20 of a preform which is in a leading position as the preform enters the gap 37, is rotated until it contacts the right hand lower rail 32b (as seen from above in FIG. 4A). To allow for this rotation of the handle a gap 40 is provide in the left hand lower rail.

It will be understood that the anticlockwise rotation induced by drive wheel 35 has no effect on those preforms entering the gap with their handles trailing, except to drive the trailing handle into contact with the right hand lower rail. Thus, all preforms downstream of the orientation mechanism 34A approach the escapement 34 in the preferred orientation with the handles in the trailing position.

The escapement 34 controls the feeding of the handle oriented preforms to the feeder wheel 36 as described above, retaining the trailing orientation of the handles as induced by the mechanism 34A. As for the first arrangement above, at the instance that a preform arrives at the pick of position 26, a pair of opposing actuators (not shown) located under the pick off position 26, simultaneously briefly close on, and then release, the preform handle 20 to fix its orientation relative the gripper 58 which, also at that instant engages with the neck 18 of the preform.

It will be understood that although the above description is specific to the rotation of the preform in an anticlockwise direction by the clockwise rotating drive wheel, orientation according to the principles of the mechanism may equally be achieved by reversing the differential rates of rotation of the two drive wheels and providing the gap in the lower guide rail on the opposite side to that illustrated in FIG. 4A. In this alternative arrangement, it is then the anticlockwise rotating drive wheel which induces clockwise rotation to the body of a preform passing between the wheels, rotating a leading oriented handle until it contacts the left hand lower rail (as seen from above in FIG. 4A), the gap allowing rotation of the handle then being provided in the right hand lower rail.

Precise orientation of the handle throughout the stages of the machine is critical to the process of preheating where the orientation must align with the alignment of heat shields, and for correctly placing the preform and the handle into the stretch-blow-moulding die.

Transfer to Preheating

Figure 6:
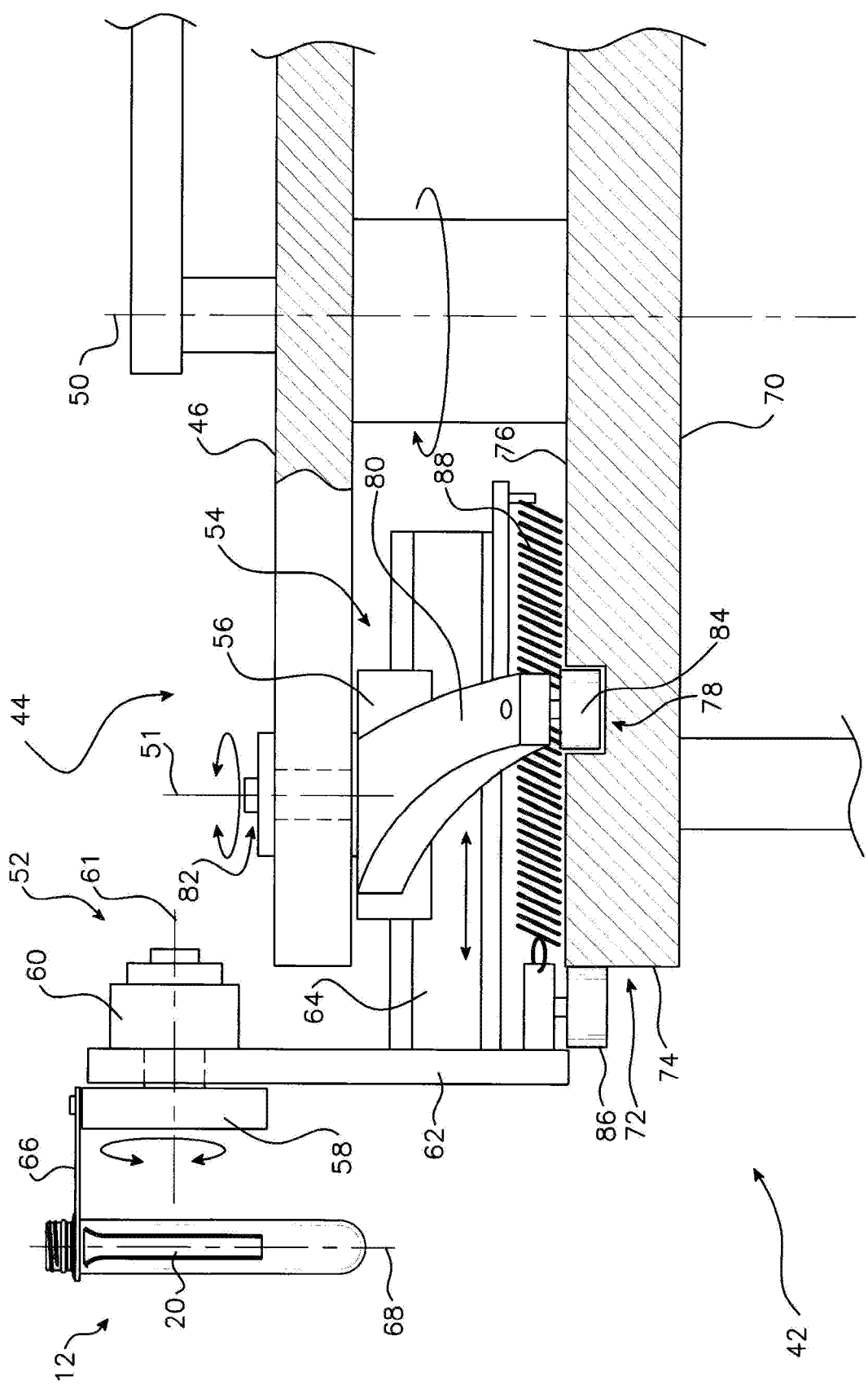
FIG. 6 is a perspective view of the first preform transfer system of FIG. 5.

Referring now to FIG. 5 and FIG. 6, a first rotating transfer system 42 is positioned adjacent the feeder wheel 36 with a continuously rotating carrier 44 of the first rotating transfer system 42 and the feeder wheel 36 contra-rotating one to the other.

The rotating carrier 44 of the first rotating transfer system 42 includes, in this embodiment, four opposing support arms 46 extending radially from a fixed centre of rotation 48 to rotate about a vertical axis 50. Each end of the arms carries a first pick and place apparatus 52. Each first pick and place apparatus 52 includes a linear guide 54, a housing 56 which is rotatably mounted to the outer end of the support arm 46, enabling rotation of the housing 56 about a vertical axis 51. A two-fingered gripper 58 is mounted to a rotary actuator 60 supported by vertical plate 62 at an outer end of a free sliding element 64 of the linear guide 54. The gripper fingers 66 are centred on a gripper effective vertical axis 68, with the gripper able to be rotated about the horizontal axis 61 of the rotary actuator 60.

A fixed horizontal cam plate 70 is mounted at a level below the rotating carrier 44 so that its centre is coincident with the vertical axis 50 of the rotating carrier. The perimeter edge 72 of the cam plate 70 forms an outer cam surface 74 and its upper surface 76 is provided with a cam channel 78 which is inboard of the perimeter edge 72 and the outer cam surface 74.

The housing 56 of the linear guide 54 is provided with an outrigger arm 80 extending radially from the centre of rotation 82 of the linear guide 54. The outer end of the outrigger arm 80 supports a first cam follower 84 locating in the cam channel 78. The free sliding element 64, adapted to reciprocating linear motion in a horizontal plane, is provided with a second cam follower 86 with the free sliding element 64 biased by springs 88 to maintain contact between the second cam follower 86 and the outer cam surface 74.

The cam channel 78 and outer cam surface 74 are arranged so that as a first pick and place apparatus 52 rotates past the preform pick off position 26, the rotation of the rotating carrier 44, combined with the loci of the first and second cam followers 84,86 causes the gripper 58 to be both reciprocatingly extended and retracted, and rotated relative the arm 46. The gripper motion is such that at the approach to the preform pick off position 26, the free sliding element 64 and thus the gripper 58 is extended followed by rotation of the linear guide 54 and gripper 58 in retrograde or negative direction relative to the direction of rotation of the rotating carrier 44.

At the instant a preform 12 arrives at the pick off position 26 after its approximate orientation, so that the handle 20 of the preform is trailing but not yet fixed, the extending movement of the gripper 58 through the first cam follower 84 against the outer cam surface 74, brings the gripper effective axis 68 into coincidence with the central axis of the preform. At this instance also, a pair of opposing actuators located under the pick off position 26 simultaneously briefly close on, and then release, the preform handle 20 to fix its orientation relative the gripper 58 which, also at that instant engages with the neck 18 of the preform. The gripper 58 is then rotated positively to carry the preform 12 clear of the supporting short rail 40 and away from the pick off position 26.

This combination of reciprocating rotation and extension and retraction of the gripper 58 compensates for the divergence of the loci of the supporting tooth formation 38 of the feeder wheel 36 and the rotating carrier 44 as they contra rotate one relative the other. It is by the means of the reciprocating rotation and retraction movements of the gripper through a combination of a rotating linear guide and the two cam loci that a smooth continuous transfer of preforms is possible between two rotating elements; that of the feeder wheel 36 and the rotating carrier 44.

Loading Into Mandrel Stage

Figure 7:
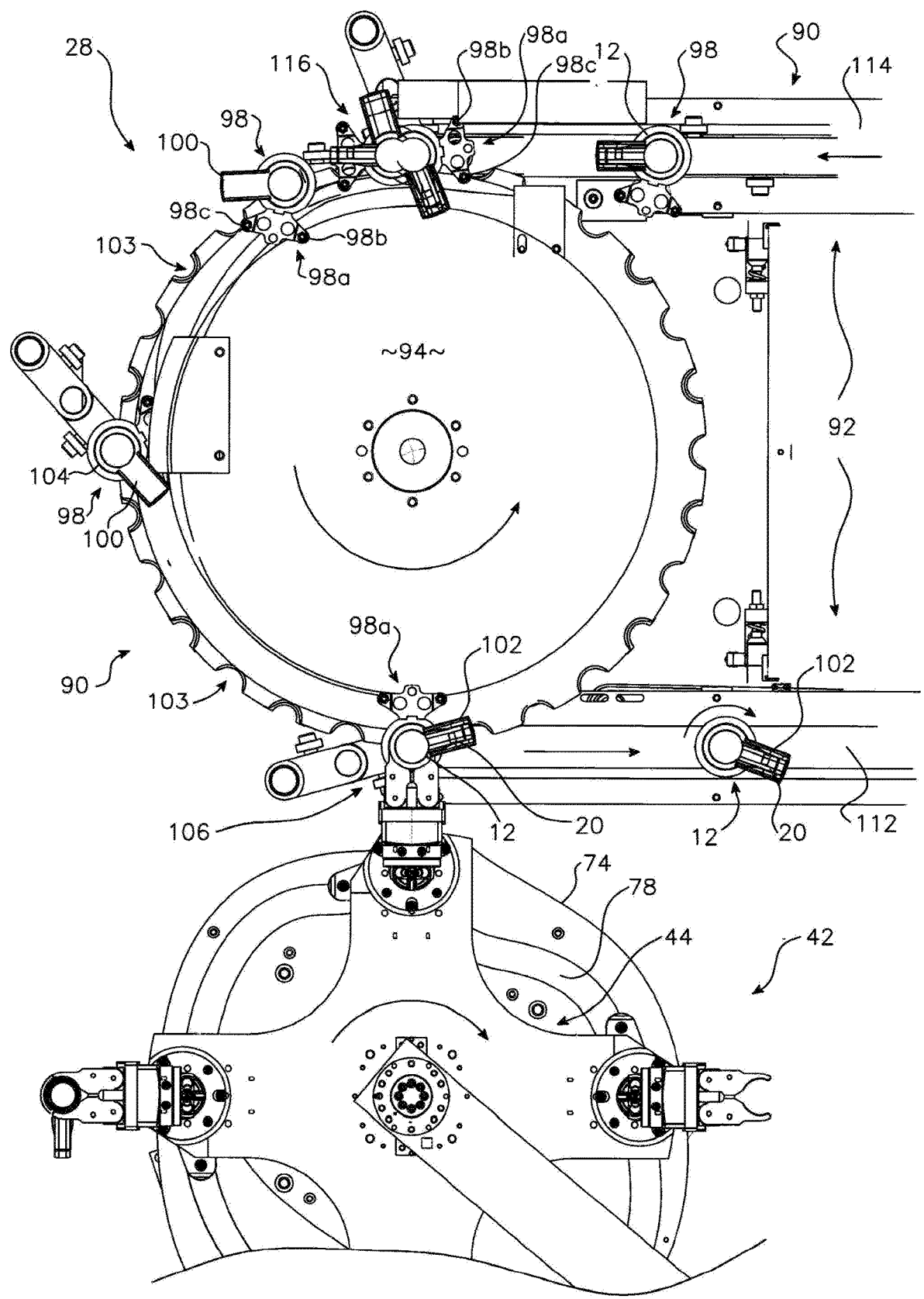
FIG. 7 is a plan view of a portion of the preform transfer system of FIGS. 5 and 6 and a preform loading and unloading area of a preform preheating stage of the machine.

With reference now to FIG. 7, rotation of the rotating carrier 44 brings a preform 12 retained in a gripper 58 to the preheating stage 28 as was shown in FIG. 3 of the machine 10. Because the preheating of the preforms is conducted with the preforms inverted from their initial position at the pick off position 26, that is, with the neck 18 upward, the rotary actuator 60 at the end of the free sliding element 64 rotates the grippers 58 and the preforms through 180 degree during their transit between pick off position 26 and the transfer to a preheating transport system 90. The effect of this rotation is that the handle 20 of the preform is now "leading" with respect to the direction of rotation of the rotating carrier 44, instead of trailing as it was at the pick off position 26 as could be seen in FIG. 5.

The preheating transport system 90 is also in continuous movement and comprises a loop rail system 92 with proximate and distal rotating guide wheels 94 and 96 respectively at either end of the loop. A plurality of preform supporting mandrels 98 are adapted to move around the loop rail system 92, driven into motion around the straight sections of the loop by a drive chain (not shown) to which they are fixed and around the guide wheels 94,96 by nesting in niches 103 of the guide wheels.

Preheating of the preform 12 is required for the body 16 of the preform, that is for that portion of the preform which will be subjected to stretching and blow-moulding, to sufficiently soften the polymer. But the handle 20 and the neck 18 which retain their as injection moulded form in the blown container shown in FIG. 3, must be protected from excessive heat as the preform moves through the preheating stage. For this reason, as shown in FIG. 8, a preform supporting mandrel 98 is provided with a heat shield 100 comprising a channel 102 rising from a cylindrical collar 104 in which the handle 20 is protected while the neck 18 is protected by its insertion into the cylindrical collar 104 of the mandrel.

It may be noted that the patterns of the outer cam surface 74 and that of the cam channel 78 of the first rotating transfer system 42 as shown in FIG. 5, near the pick off position 26 differ from those at the approach to, and following the preform transfer to preheating position 106. This reflects the difference in movements required of a gripper 58 as it steers the preform into the position in which the vertical axis of the preform becomes aligned with that of the cylindrical collar 104 of the mandrel 98 and the handle 20 is aligned with the heat shield channel 102. At the instant these axes are aligned and the handle 20 of the preform is aligned between the side elements of the channel 102, a cylindrical plunger 108 within the collar 104 rises into the neck 18, then lowers to bring the neck to an inserted position within the collar. These movements of course take place while the first rotating transfer system 42 and the proximate guide wheel 94 are in continuous contrarotation. This complex movement is again made possible by the combination of the rotation of the arm 46 and the rotation and linear movements of the free sliding element 64, and thus of the gripper fingers 66 of the first pick and place apparatus 52.

Preheating of Preforms

Figure 8:
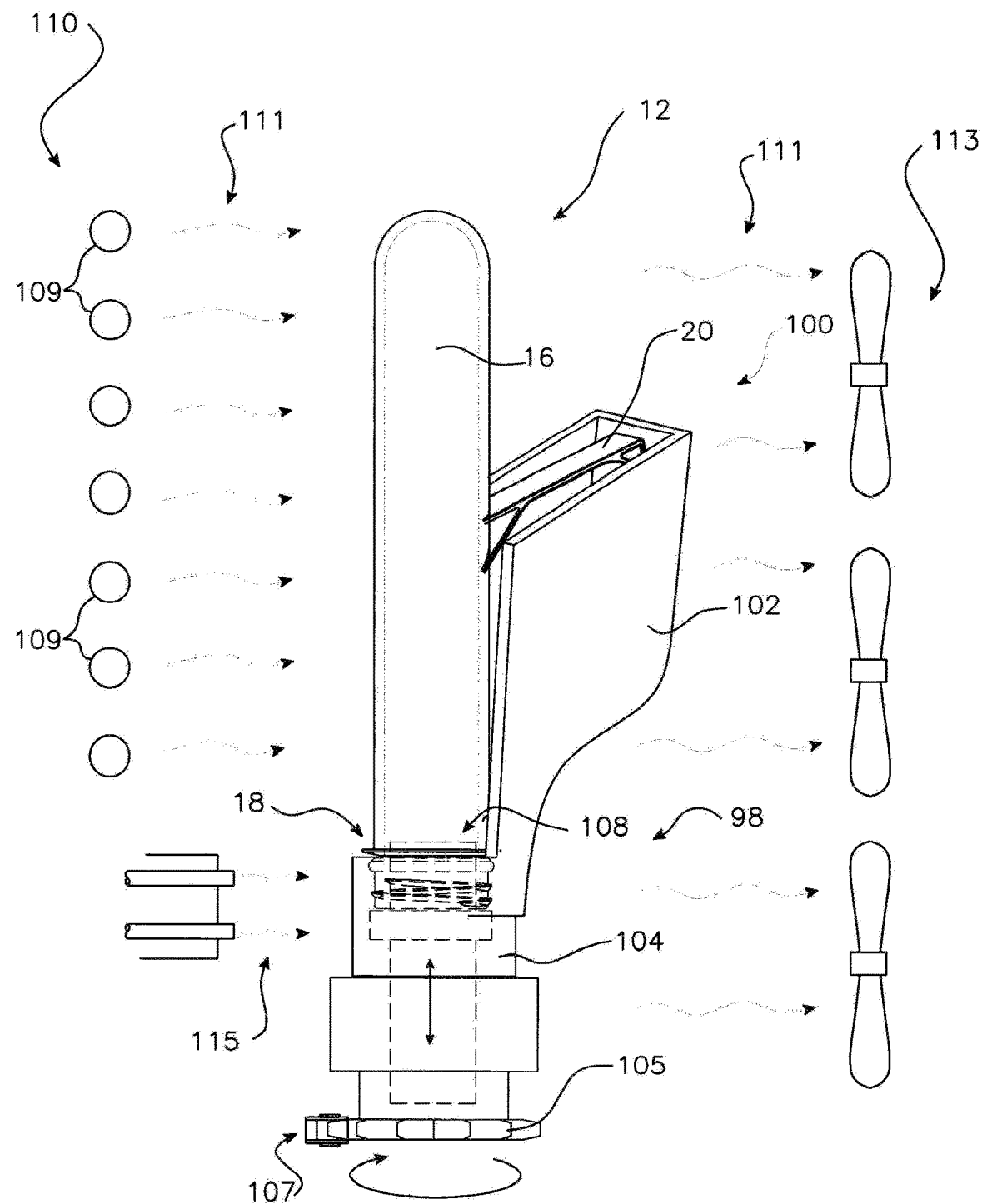
FIG. 8 is a perspective view of a perform of FIG. 1 inserted into a mandrel with heat shield for transport through the preform preheating stage of the machine.

As best seen in FIGS. 3 and 8, banks 110 of heating elements 109 are positioned along each of the straight sections of the loop rail system 92. Graded hot air 111 is drawn across the path of the preforms 12 by extractor fans 113. To prevent excessive heat build-up of the cylindrical collar 104 and the neck 18 of the preform in the collar, a cooling air stream 115 is directed at the collars.

As a mandrel 98 and preform 12 are rotated away from the transfer-to-preheating position 106 by the proximate rotating guide wheel 94, the mandrels supported in the chain of the preheating transport system 90 travel along the first straight section 112, around the distal rotating guide wheel 96 and back along the second straight section 114 to arrive at a transfer-from-mandrel position 116. While traversing these straight sections, the mandrels are rotated about their vertical axes by a gear 105 of the mandrel engaging with chain 107 to evenly expose the bodies of the preforms to heat from the banks 110 of heating elements 109. The heating elements 109 are each arranged as a series of infra-red heating elements which are individually adjustable as to their proximity to the passing preforms.

It will be understood that the orientation of each mandrel 98 at both the transfer to preheating position 106 and at the transfer from mandrel position 116 is critical to allow the respective first and second transfer systems to insert and extract a preform handle from the channel of the mandrel's heat shield. These heat shield orientations with respect to the periphery of the proximate guide wheel 94 are not the same at these two positions so that the orientation of the mandrel and its heat shield need to be changed from that demanded at the handle extraction position to that required at the handle insertion position.

To this end, each mandrel is provided with a guide carriage 98a fixed to the mandrel. As a mandrel approaches the transfer-from-mandrel position 116, cam followers 98b and 98c engage with guide channels to rotate the mandrel into the required orientation. During transit about the periphery of proximate guide wheel 94, the cam followers 98b and 98c follow cam channels of a cam plate above the proximate guide wheel to bring the orientation of the heat shield to that required at the transfer-to-preheating position 106.

Transfer to Mould

Figure 9:
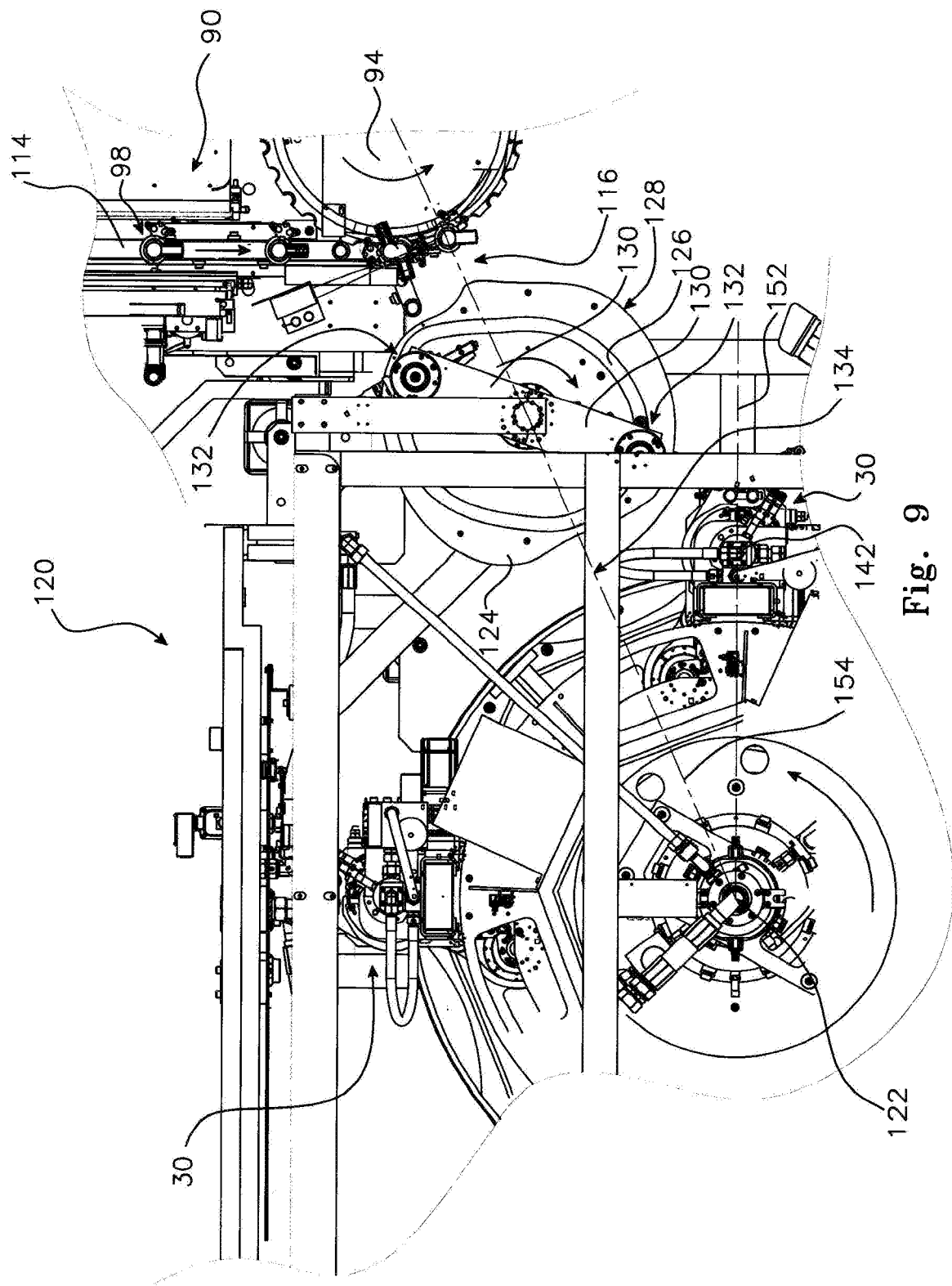
FIG. 9 is an enlarged plan view of section of the machine showing a portion of the preform loading and unloading area of FIG. 7, a second transfer system and a portion of the stretch-blow-moulding dies assembly of the machine.

With reference now to FIG. 9, a second rotating transfer system 118 operates to transfer preforms 12 from the preheating transport system 90 to a stretch blow moulding die assembly 120. The stretch blow moulding die assembly 120 comprises of four stretch blow moulding dies 30, two of which can be seen in the truncated view of the machine in FIG. 9. In the present embodiment, four radially disposed stretch blow moulding dies 30 rotate continuously about a common centre 122.

The second rotating transfer system 118 is of similar configuration to that of the first rotating transfer system 42 described above. That is, it includes a cam plate 124, also provided with an inboard cam channel 126 and an outer cam surface 128 around its periphery.

In this instance, second rotating transfer system 118 includes two, rather than four, continuously rotating opposing radial arms 130, each of which carries a second pick and place apparatus 132. Again, similar to the first pick and place apparatuses 52 of the first rotating transfer system 42 above, each includes a linear guide rotatably mounted to the respective outer end of the radial arm 130, with the free sliding element of the linear guide supporting a rotary actuator which, in turn supports a gripper. In this arrangement also, a first cam follower of an outrigger arm attached to the housing of the linear guide, locates in the inboard cam channel 126, while a second cam follower of the free sliding element of the linear guide remains in contact with the outer cam surface 128 by means of a spring.

Preforms still retained in preform supporting mandrels 98 arrive back at the rotating proximate guide wheel 94 of the preheating system and approach the transfer-from-mandrel position 116, and are rotated into the required orientation of the heat shield as explained above. The cylindrical plunger 108 of a mandrel 98 approaching the transfer-from-mandrel position 116, lifts the preform so that the neck is clear of the cylindrical collar 104 to allow the gripper of the second rotating transfer system 118 to engage the preform by the exposed neck 18. Again, it is the motion of the gripper induced by the combination of rotation of the radial arm 130, the rotation of the linear guide and linear movements of the free sliding element supporting the gripper as controlled by the cam channel 126 and outer cam surface 128, which allows the preform and its handle to be smoothly removed from the preheating transport system 90.

As one rotating radial arm 130 of the second rotating transfer system 118 approaches and removes a preform from the preheating transport system 90, the opposite radial arm approaches the die loading position 134. During its rotation from the transfer-from-mandrel position 116 to the die loading position 134, the rotary actuator of the second pick and place apparatus 132 rotates about its horizontal axis to change the preform from its inverted position held during the preheating stage, back into an upright position. (It should be noted that FIG. 9 shows both a rotating arm 130 and a stretch blow moulding die 30 approaching the die loading position 134)

Figure 10:
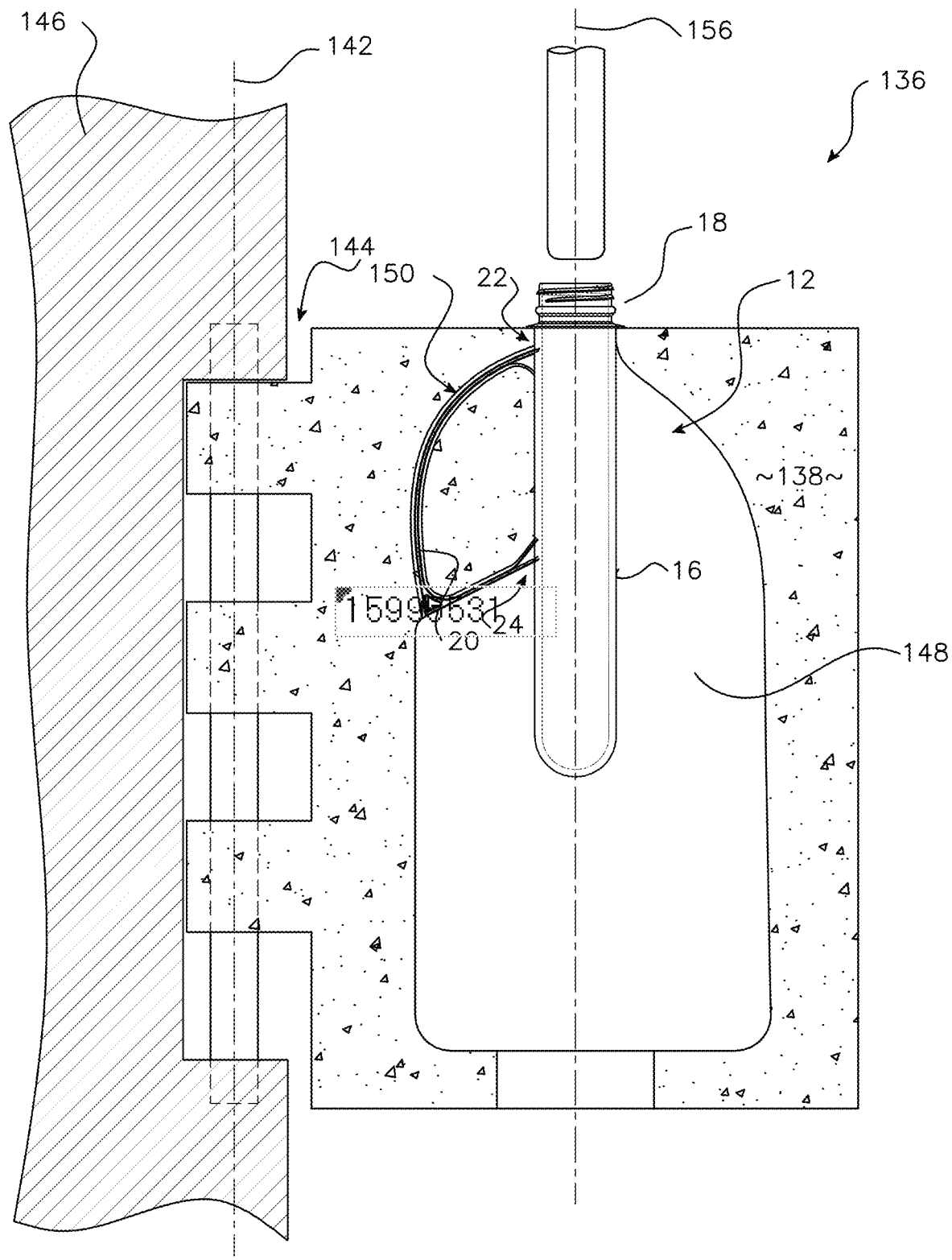
FIG. 10 is a front view of one half of a stretch-blow-moulding die for the production of the container shown in FIG. 2.

Stretch blow moulding dies of the die assembly 120, are in the form of two die halves 136, one of which is shown in FIG. 10. Die halves 136 are hinged together about a vertical axis 142 in the manner of a bivalve, and with the hinge supported from a central structure 146 of the die assembly 130 in a typical arrangement for radial stretch-blow-moulding machines. The face surface 138 of the die half shown in FIG. 10 has been shaded to highlight the die cavity 148 for the body 16 and integral handle 20 of the preform. As is common in the stretch-blow-moulding of containers, the neck 18, which remains unaltered in the stretch-blow-moulding process, projects out of the die when closed.

Referring again now to FIG. 9, as stretch-blow-moulding dies 30 approach the loading position 134 the die halves open symmetrically about a bisecting radial line 152 passing through the centre of rotation 122 and the vertical axis 142 of the die hinge 144, in preparation for receiving a preform. It may noted from FIGS. 3 and 9, that the rotation centres of the second rotating transfer system 118, the proximate rotating guide wheel 94 of the preheating stage and that of the stretch-blow-moulding die assembly 120, lie along a straight line 154.

As an opened die 30 approaches the die loading position 134 lying on the straight line 154, a radial arm 130 with a preform retained in the gripper of the second pick and place apparatus 132 also approaches the loading position. As the bisecting radial line 152 of the die halves 136 becomes coincident with the straight line 154, the movements of the second pick and place apparatus 132 has brought the gripper effective vertical axis and thus the vertical axis of the preform into coincidence with the axis 156 of the die (as defined by the centre of the preform body when held in the die) and with the handle oriented to lie in the vertical plane defined by the straight line 154. While the die halves close and the paths of the die 30 and the end of the rotating arm 130 begin to diverge, the rotation and extension of the gripper, still holding the neck 18 of the preform, ensures the orientation of the handle is maintained in that vertical plane defined by the bisecting line of the die halves until closure is complete. The gripper then disengages from the preform neck.

It can be seen from FIG. 10, that the curved section of the handle 20 of the preform is nested in a constricting cavity 150 of the die which ensures that the handle is not distorted, nor the region between the junction points 22,24 stretched. The underside of the straight section of the handle forms a surface which, in effect, determines the shape of the container under the handle.

Figure 11:
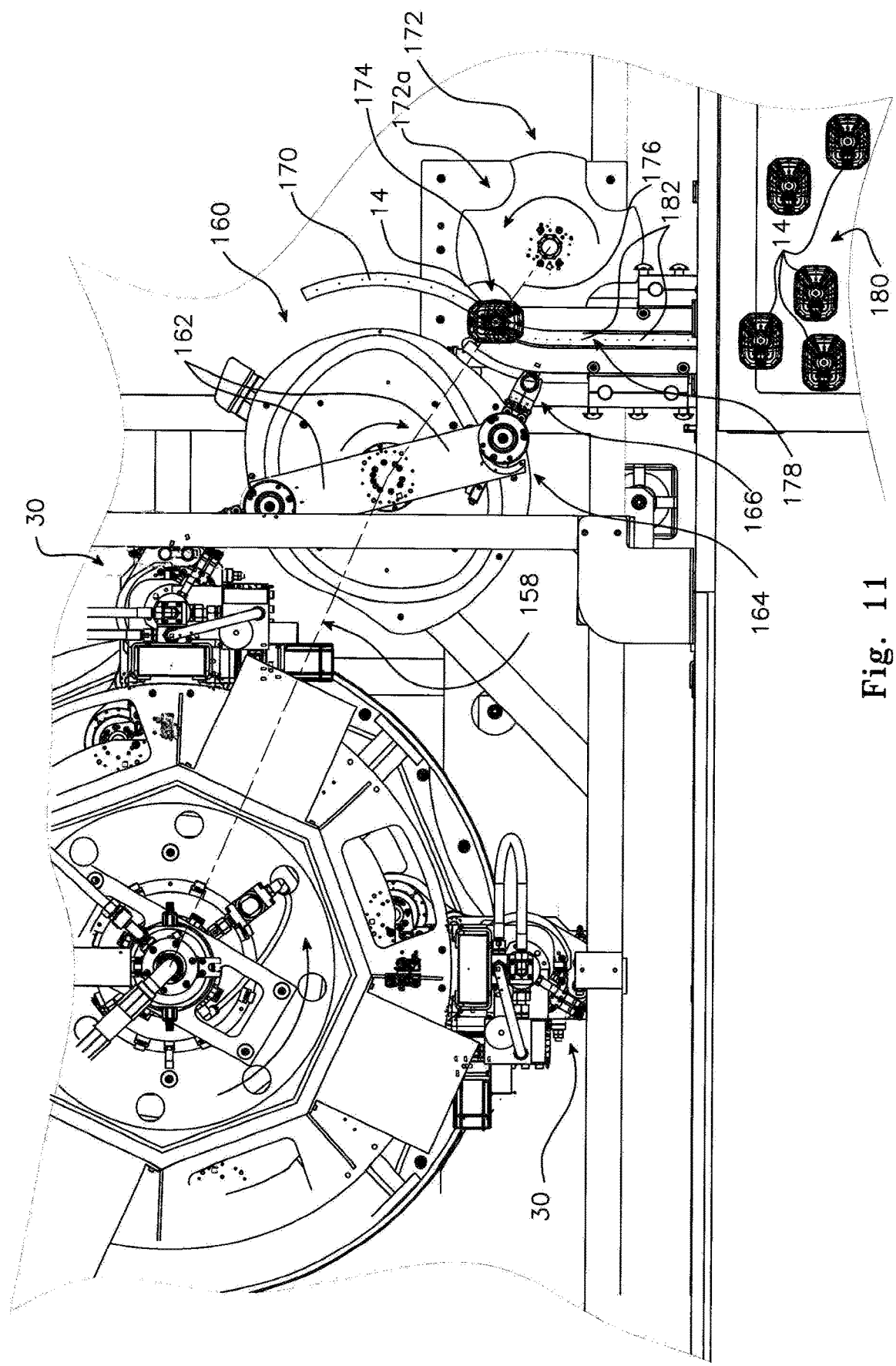
FIG. 11 is a plan view of a portion of the machine of FIG. 3 showing the region of transfer of blown containers from a stretch-blow-moulding die to a container receiving bin.

With the die halves 136 closed, stretch-blow-moulding of the container proceeds and the die 30 loaded at the die loading position 134 rotates towards the die unloading position 158 as shown in FIG. 11.

Container Unloading

A third rotating transfer system 160 is located adjacent the stretch-blow-moulding die assembly 120, and is configured in similar manner to that of the first and second rotating transfer systems 42,132 described above. As for the second rotating transfer system 132, the third rotating transfer system 160 includes opposing radial arms 162 at the ends of each of which is a third pick and place assembly 164. It does not however include a rotary actuator since the container which emerges from the die remains in an upright position through the discharge process.

As for the first and second rotating transfer systems, movements of a gripper 166 is controlled by a combination of the rotation of the opposing radial arms 160, the linear movement of the free element of the linear guide and the two cam loci.

As the stretch-blow-moulding die 30, now containing a finished container 14, nears the die unloading position 158 lying on the line 168 joining the centres of rotation of the stretch-blow-moulding die assembly 120 and of the opposing radial arms 160 of the third transfer system, the gripper of the pick and place is maneuvered into position to grasp the neck of the container. As the die reaches the die unloading position, the die halves open and the gripper extracts the blown container 14 from the die 30.

The third rotating transfer system 160 continuous to rotate, tanking the container 14 held by the gripper 166 into a discharge channel 172, with the base of the container passing over a guide rail 170. Guide rail 170 transitions from concentricity with the third rotating transfer system to concentricity with a rotating two-tiered outfeed wheel 172. As the container 14, now in the discharge channel 182, reaches a release position 174 lying on the line 176 joining the centres of rotation of the third rotating transfer system 160 and that of the outfeed wheel 172, the gripper 166 releases the neck and retracts. At the same time a scalloped indentation 172a of the rotating outfeed wheel captures the body of the container feeding it into a discharge channel 178. As containers follow the path of the gripper 166 and then a path determined by the outfeed wheel 172, the base of the container receives cooling air from orifices 182 in guide rail 170, backpres sure from accumulating containers in the discharge channel 172 force containers to drop into a container receiving bin 180.

Control of the Machine

The operation of the machine 10 is under the control a programmable logic controller. As well as ensuring that all rotation drive servo motors operate synchronously, the controller provides for fully adjustability of the parameters of the preheating elements and of the parameters of the stretch-blow-moulding dies. This includes setting differential temperature gradients allowing for a gradually increasing exposure to heat as preforms progress around the preheating transport system, and automatic adjustment of heating element temperatures for changing ambient temperatures.

Control of the preheating is particularly critical in the present system because of the unique characteristics of the preform dictated by the integral handle of the preform. The preheating is thus designed to allow for lateral flow of material in the area between the two junction points of the handle while limiting longitudinal flow and extension during the stretching phase of the stretch-blow-moulding process. Instead, the manner in which heat is applied to the preform ensures that the bulk of polymer which forms the outer shell of the container of FIG. 2, is produced from that region of the preform below the lower junction point of the handle.

Figure 12:
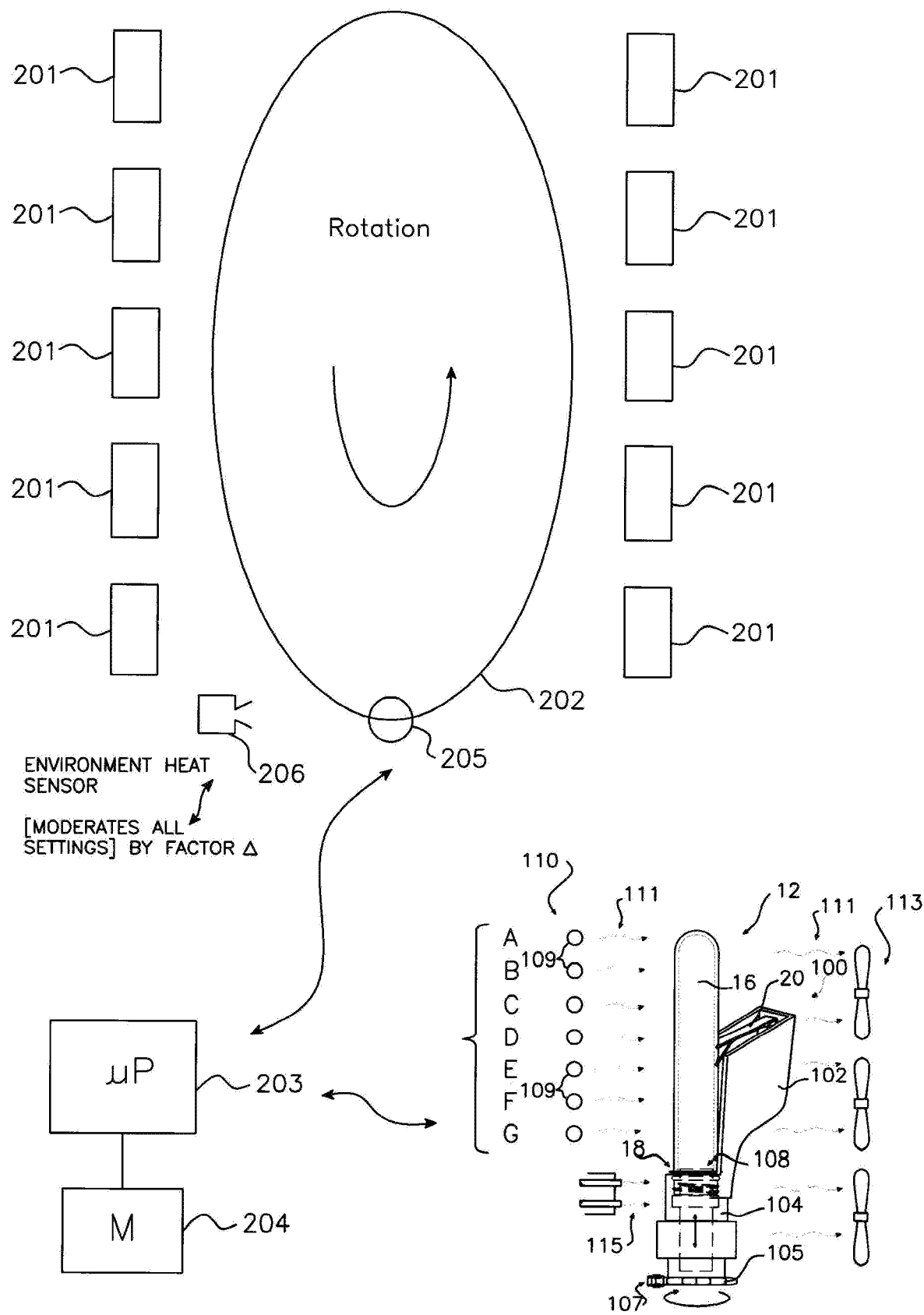
FIG. 12 is a schematic block diagram of control components associated with control of the heating and transport of the preforms usable with any of the above described embodiments.

FIG. 12 is a schematic block diagram of control components associated with control of the heating and transport of the preforms usable with any of the above described embodiments.

As best seen in the inset of FIG. 12, banks 110 of heating elements 109 are positioned along each of the straight sections of the loop rail system 92. Graded hot air 111 is drawn across the path of the preforms 12 by extractor fans 113. To prevent excessive heat build up of the cylindrical collar 104 and the neck 18 of the preform in the collar, a cooling air stream 115 is directed at the collars.

In a preferred form each bank 110 comprises a module 201. The modules 201 are arranged sequentially around the conveyer 202 as illustrated in FIG. 12.

In a preferred form a processor 203 in conjunction with memory 204 executes a program for control of the heating elements 109 of the modules 201.

In a particular preferred form each element 109 of each module 201 is controlled individually by the processor 203.

In an alternative preferred form the elements 109 are controlled as a group based on height—so the top most elements 109 of the modules 201 are controlled to a predetermined temperature together whilst the next down in height elements 109B are also controlled together to a predetermined temperature—and so on down to elements 109G at the lowest level.

In addition the processor 203 controls the speed of rotation of motor 205 in order to control the continuous speed of the preforms 16.

A temperature sensor 206, in one form an infrared temperature sensor provides environment temperature sensing which is utilised by processor 203 to modulate the degree of heating of all elements 109 by a difference factor delta (Δ).

This allows for a global control of the system temperature in response to variations in ambient temperature.

As noted above, the stretch-blow-moulding machine is especially developed for, and adapted to, the feeding and transportation of a non-symmetrical preform with integral handle and, ultimately the stretch-blow-moulding of that preform into a container with an integral handle. The preform according to the invention may take a number of different forms described below, although common to all are the neck portion 18 and the integral handle 20 as shown in FIG. 1.

The preforms now to be described differ primarily in respect of the configuration of their internal surfaces, offering benefits of improved distribution of polymer material to the walls of the blown container as well as significant improvement in economy of manufacture due to reductions in the volume of polymer required.

First Preferred Preform Embodiment

Figure 13:
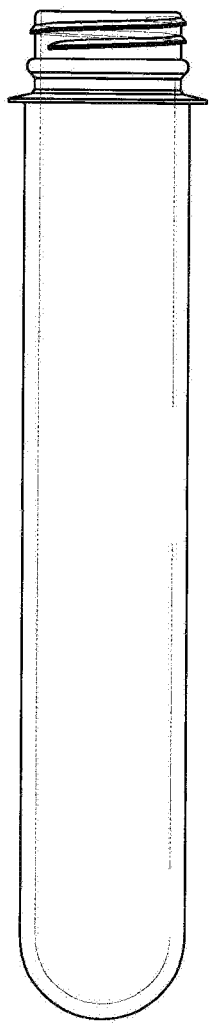
FIG. 13 is a side view of typical injection-moulded preform for stretch-blow-moulding of a polymer container.
Figure 13A:
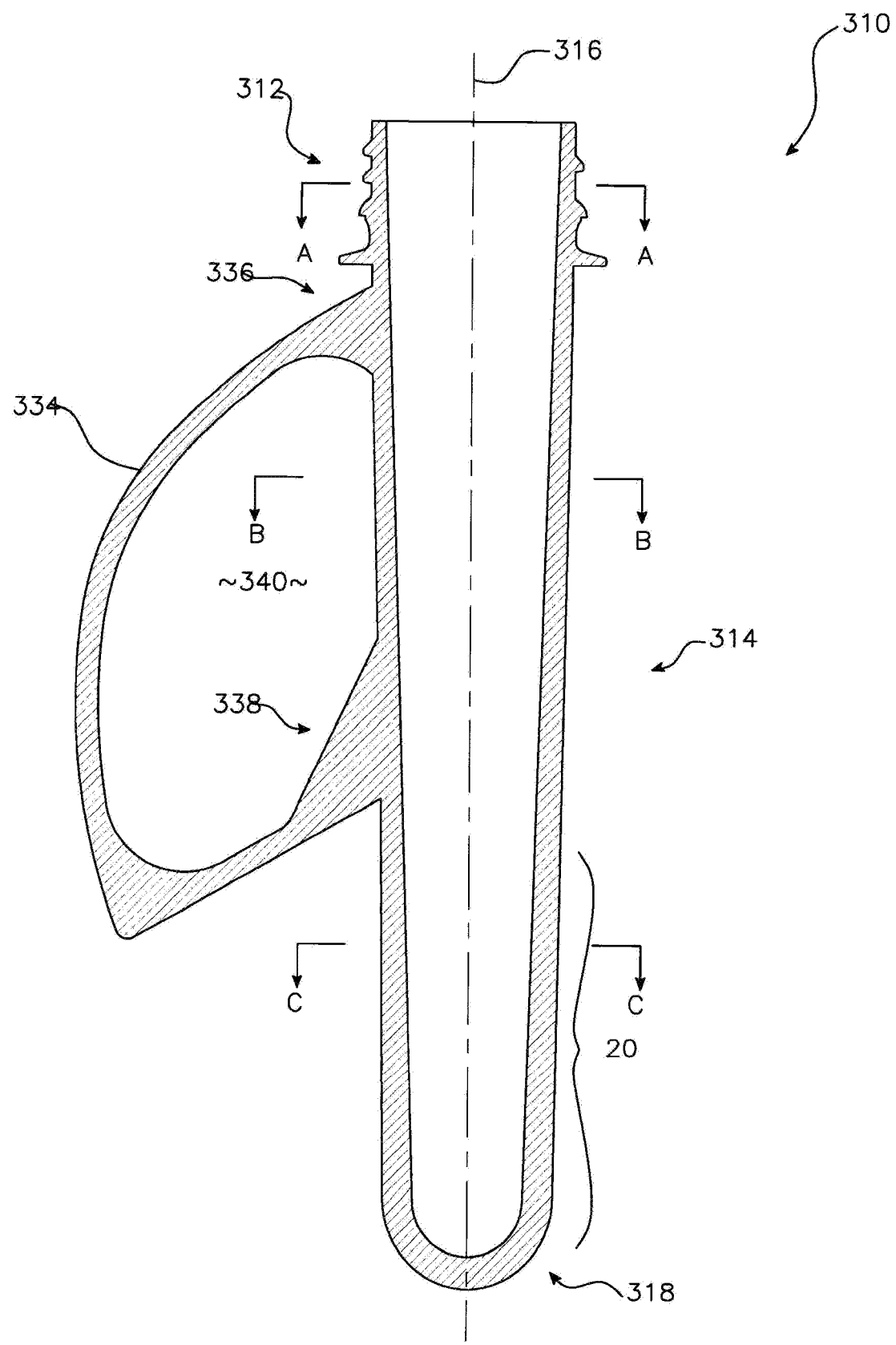
FIG. 13A is a sectioned side view of a preform according to a preferred embodiment of the invention in which a central vertical plane passing through a central vertical axis of the preform lies in the plane of the paper.

In a first preferred a preform 310 according to the invention as shown in FIG. 13A includes a finished neck portion 312 and a tubular hollow body portion 314 extending from below the neck portion. Similar to preforms of the prior art, the outer surfaces of the body portion 314 are defined by diameters centred on a central vertical axis 316, so that the body portion 314 approximates a cylinder but with a decrease in diameters from the neck portion 312 to the closed end 318 of the preform.

Figure 15:
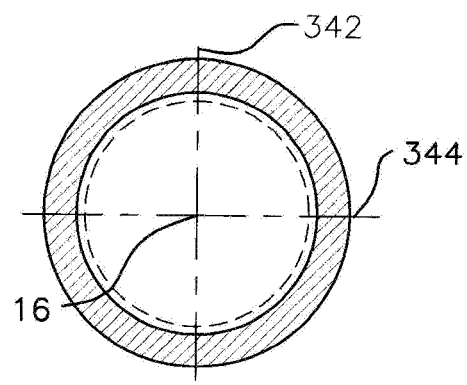
FIG. 15 is cross section along the vertical central axis of the mandrel of FIG. 14 taken at the level of A-A.
Figure 16:
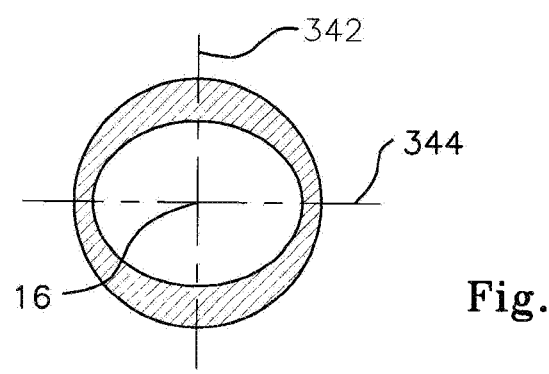
FIG. 16 is a cross section along the vertical central axis of the mandrel of FIG. 3 taken at the level B-B.

The internal surfaces of the preform 310 include surfaces of the hollow body portion 314 which are not concentric with the outer surfaces. Preferably, as shown in FIGS. 15 and 16, cross sections of the internal surfaces of the preform 310 are circular and concentric in the neck portion 312 of the preform as indicated by the cross section A-A, but below the neck portion are of ovoid form as indicated by section B-B. All sections are however centred on the central longitudinal axis 316 of the body of the preform.

Figure 14:
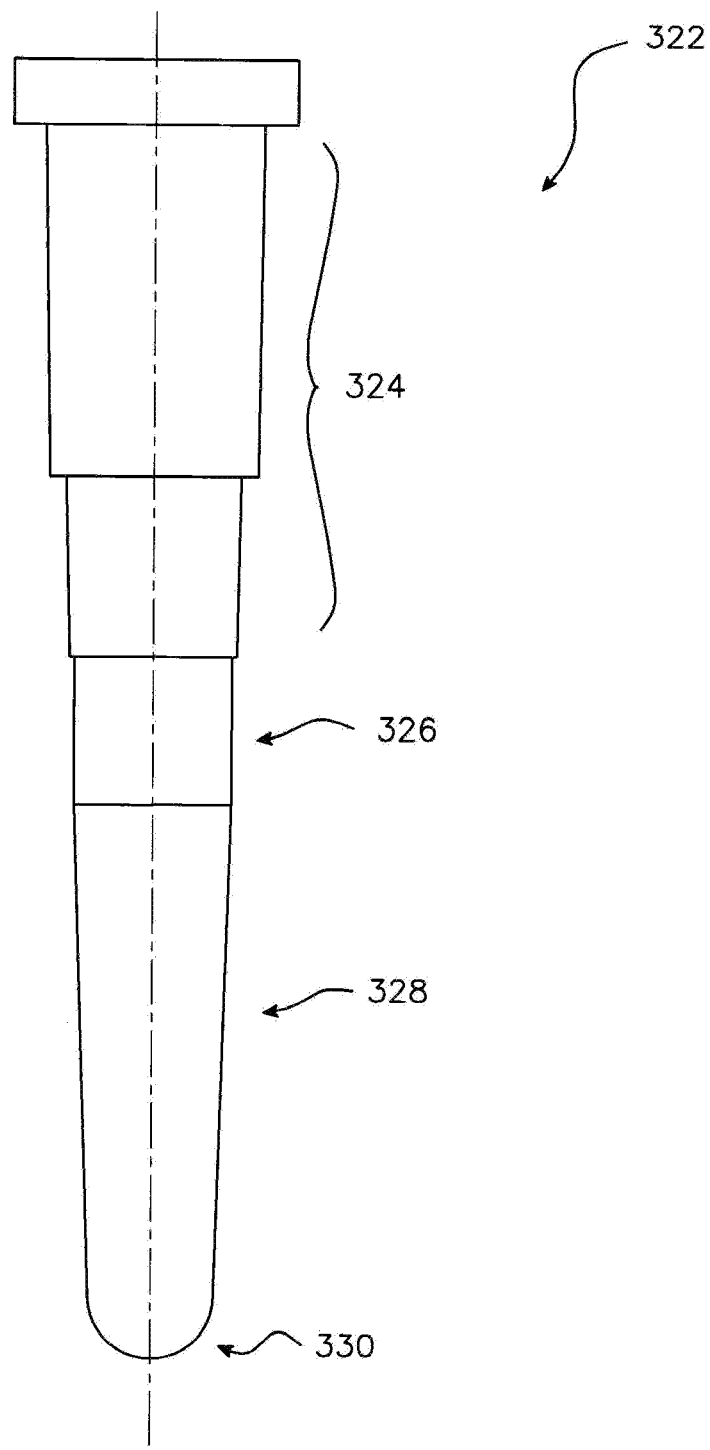
FIG. 14 is a side view of a mandrel for injection-moulding the preform of FIG. 13A in which a central vertical plane passing through a central vertical axis of the mandrel lies in the plane of the paper.

Referring now to FIG. 14, in a preferred arrangement, the mandrel 322 around which the preform 310 is injection moulded, comprises an upper region 324 of circular cross sections adapted to position and retain the mandrel in its correct position in an injection moulding cavity. A first preform-defining portion 326 of the mandrel extends from this upper region 324 to a depth equal to that of the neck portion 312 and is of circular cross section A-A as shown in FIG. 4 to form the concentric walls of the neck portion. The ovoid portion 328 of the mandrel depends from the first portion 326, extending to the tip 330 of the mandrel.

Given the ovoid shape of the cross sections of the ovoid portion 328, there is a short transition portion of the mandrel immediately below portion 326 forming the internal form of the neck portion, which transitions from the circular cross section A-A of portion 326 to the ovoid sections B-B. This transition thus takes the form an asymmetrical frustum of a cone; an upper end of which has a diameter equal to that of a lower end of the first portion 326 with the lower end of the transition portion conforming in cross section to the upper end of the ovoid cross section B-B of the remaining length of the preform.

It can be seen from FIG. 13A, that both the outer surfaces of the body portion 314 of the preform and the ovoid portion of the inside surfaces as defined by the mandrel 322, are tapering; that is, the diameters defining the external surface of the preform are decreasing from below the neck portion 312 to the bottom 318, while similarly, the major axis 344 and the minor axis 342 of the cross sections of the ovoid portion 328 also decrease accordingly.

Referring still to FIG. 13A, the preform 310 of the invention further includes, as noted above, an integral handle 334 which forms a loop of material extending vertically from an upper junction 336 below the neck portion 312 to a lower junction 338 with the outer surface of the preform. The handle 334 is centred on and defines a central vertical plane 340 (lying in the plane of the paper) which contains the central longitudinal axis 316 of the preform.

The mandrel 322, and thus the internal surfaces of the ovoid portion 328, are so oriented relative the handle 334, that major axis 344 of the ovoid cross section B-B lies in the central vertical plane 340.

It can thus be seen from FIG. 16 and cross section B-B that the wall thicknesses of the preform 310 in that portion 328 of the preform in which the inner surfaces are defined by the ovoid cross section, varies from a maximum at opposite ends of the minor axes 342 of the ovoid cross section to minimum thicknesses at outer ends of the major axis 340. Preferably, the ratio of maximum wall thickness to minimum wall thickness of the ovoid portion lies in the range of 2:1 and 2.2:1.

Figures 17, 18:
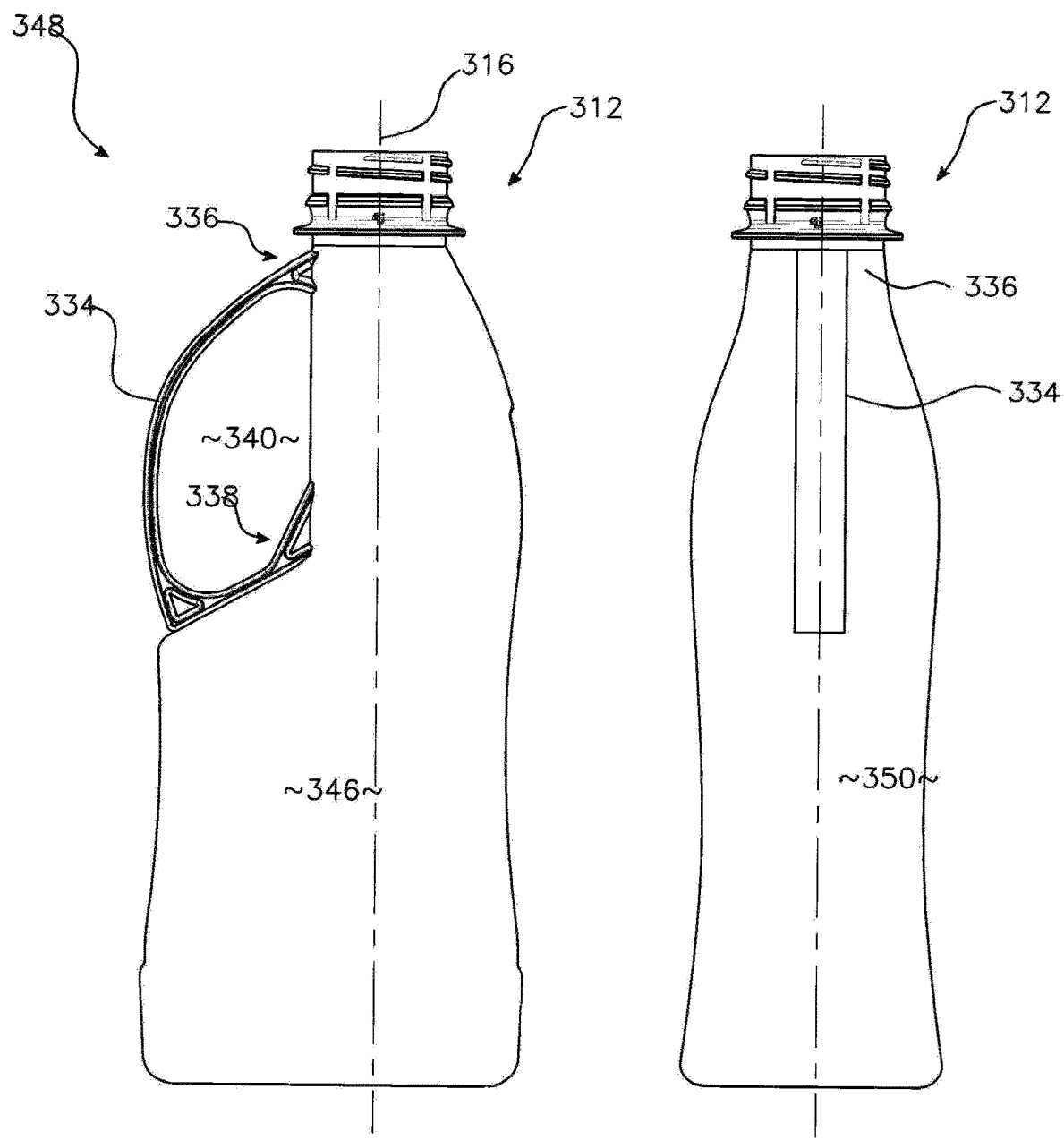
FIG. 17 is a side view of a container stretch-blow-moulded from the preform of FIG. 2.
FIG. 18 is a handle end view of the container of FIG. 17.

The distribution of polymer in the preform according to the invention, afforded by the non-symmetry of the ovoid portion, allows polymer walls of the preform in the region of maximum thickness to be biased predominantly towards the longer side walls 346 of a rectangular cross section blown container 348, while the polymer walls of the preform from the region of minimum thickness is predominantly distributed towards the shorter side walls 350 of the blown container such as shown in FIGS. 17 and 18. It can be seen from FIGS. 17 and 18 that the longer side walls 346 lie on either side of the central vertical plane 340 and thus the handle 334 so that the alignment of the major axis 344 with the vertical plane 340 ensures that the polymer from regions of maximum wall thickness are directed to those longer side walls.

Second Preferred Preform Embodiment

With reference now to FIG. 19, in this preferred embodiment, the exterior surface 410 of the preform 400 of this embodiment, is of substantially cylindrical form. As for the first embodiment above, it too includes an integrally injection moulded handle 434. In this embodiment, the internal surfaces 414 of the preform are consistently circular in section as shown in the two sample cross sections FIG. 19A and FIG. 19B. However, again as is clear from the two cross sections and the sectioned side view of FIG. 19, there is a tapering of the internal surface 414 so that the wall sections, though concentric to the external surface, increase from a minimum thickness at the neck portion 412 of the preform to a maximum proximate its lower end 418.

Third Preferred Preform Embodiment

In this further preferred embodiment of the invention, a preform 500 as shown in FIG. 20, is formed to significantly reduce the volume of material required to produce the containers shown in FIGS. 17 and 18. As in the embodiments above, the preform 500 includes an injection moulded integral handle 534. Although in this embodiment, the neck portion 512 is identical in its exterior and internal forms to that of the earlier embodiments, there is a substantial reduction in the diameter of the substantially cylindrical portion of the body of the preform below the neck portion.

In this embodiment also, as in the second preferred embodiment above, the internal surfaces of the preform are consistently circular in section as shown in the two sample cross sections A and B of FIGS. 20A and 20B, but taper with the wall sections increasing from the minimum thickness obtaining in the neck portion and through the transition in diameters below the neck portion, to a maximum wall thickness proximate the lower end 518 of the preform.

As a further means of reducing the volume of material in the preform of this embodiment, the outer surface 510 below the neck portion 512, also tapers towards the lower end 518.

Fourth Preferred Preform Embodiment

Figures 21, 21A, 21B:
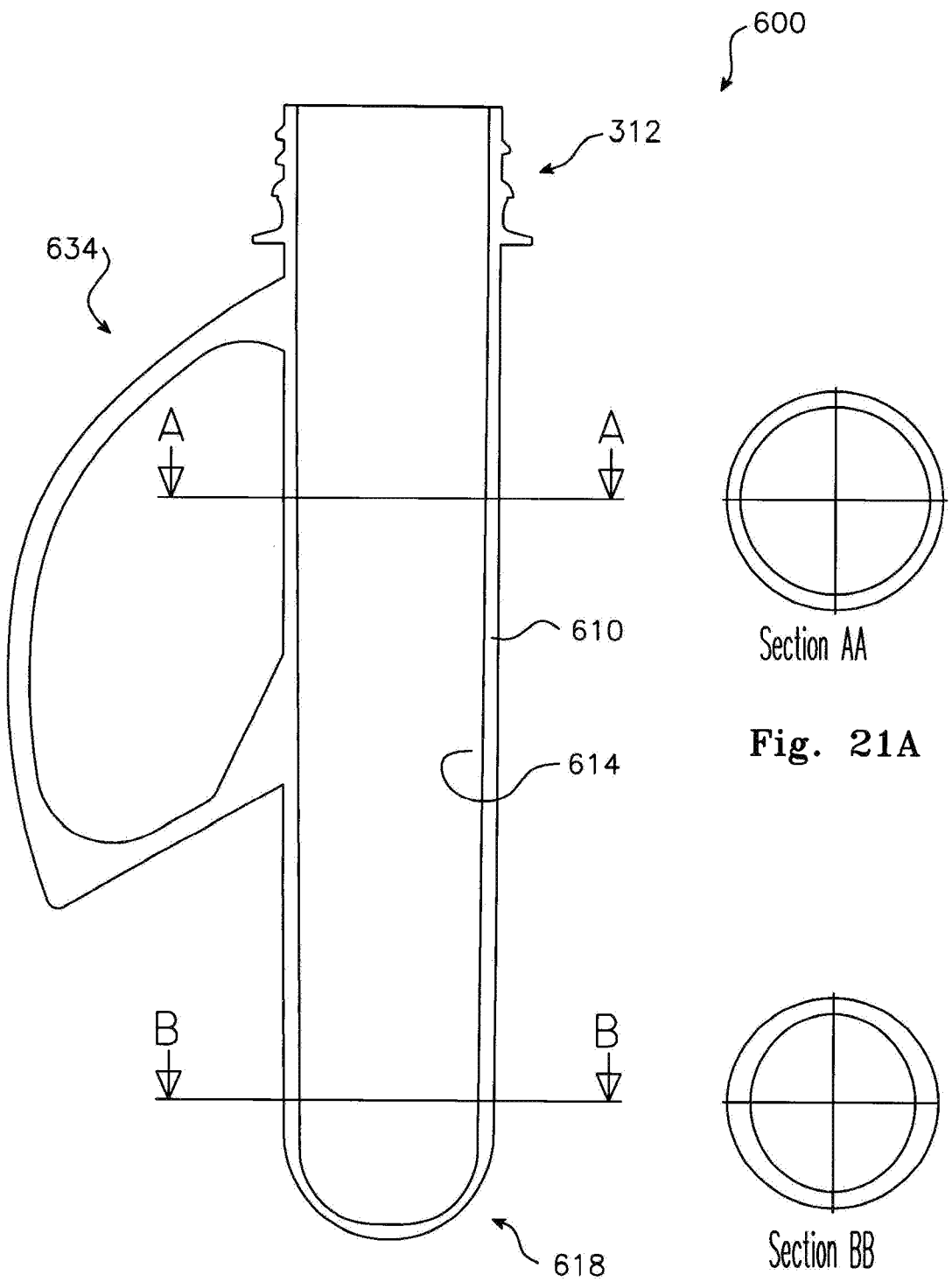
FIG. 21 is a sectioned side view of a further preferred embodiment of a preform according to the invention.
FIGS. 21A and 21B are selected cross sections of the preform of FIG. 21.

With reference now to FIG. 21, this preferred embodiment of a preform 600 according to the invention, shares a number of characteristics with that of the first and second preferred embodiments above. It has, (as have all the preform embodiments of the present invention), an integral handle 634 as previously described, and, as in the first preferred embodiment above, the internal surfaces 614 of the preform are not consistently of circular section throughout the length of the preform. However, the external surfaces 610 of the perform are substantially cylindrical in form as in the second preferred embodiment.

Thus, although the external surfaces 610 are defined by circular cross sections, the internal surface 614 varies from circular in cross section from the neck portion 612 down to section A-A in FIG. 21A, to then transition to an ovoid section B-B as shown in FIG. 21B, approaching the lower end 618.

A feature of this particular embodiment is that the wall thickness of the ovoid portion of the internal surface 614 of the perform at the ends of the major axes remains constant with the wall thicknesses of the concentric cross sections from section A-A and upwards, while there is a thickening of the walls increasing to maximum at the minor axis of the ovoid cross section.

Fifth Preferred Preform Embodiment

Figures 22, 22A, 22B:
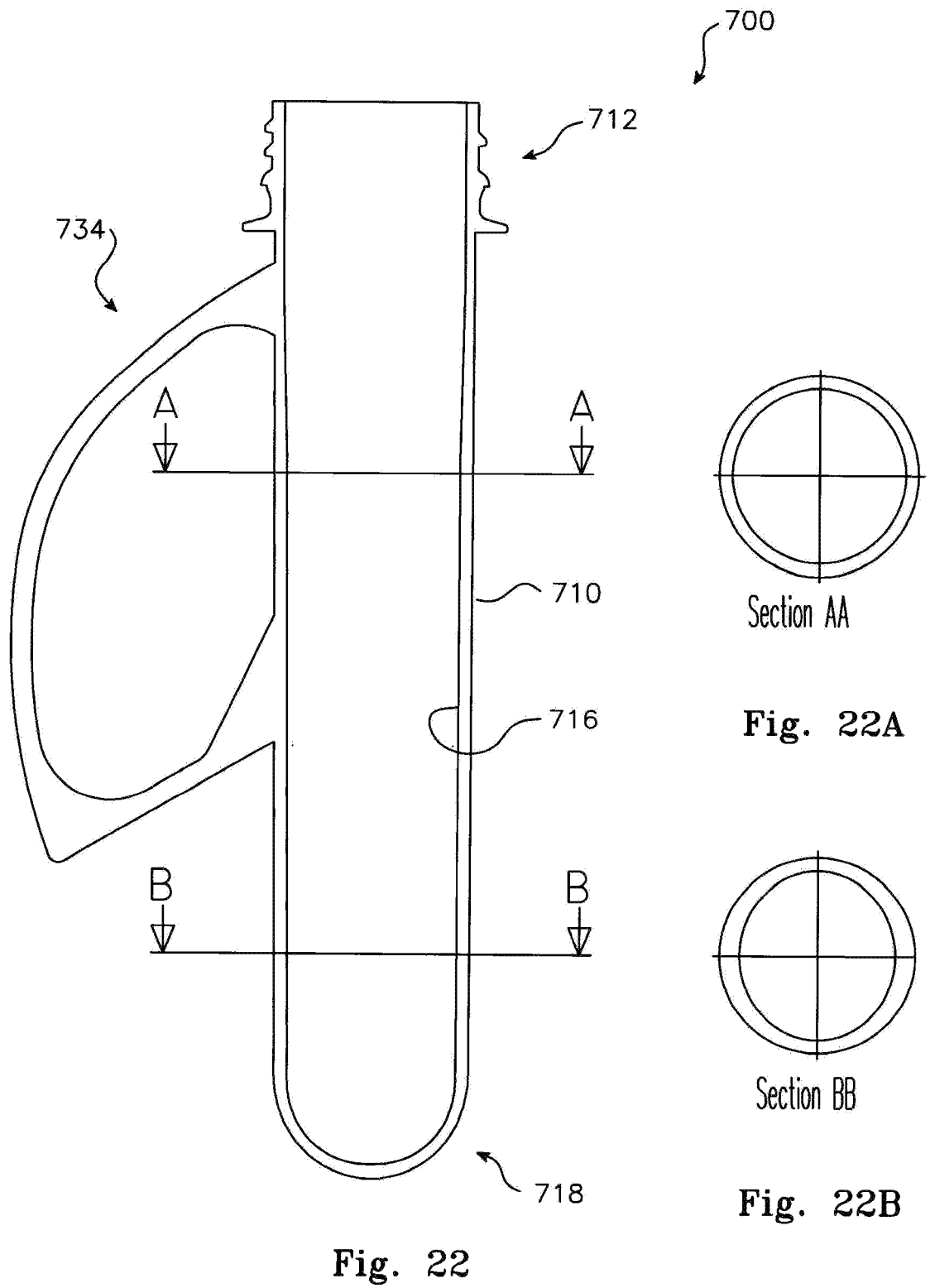
FIG. 22 is a sectioned side view of a further preferred embodiment of a preform according to the invention.
FIGS. 22A and 22B are selected cross sections of the preform of FIG. 22.

The preform of this embodiment of a preform 700 shown in FIG. 22 is similar to that of the fourth preferred embodiment above, but here, as shown in the cross section views A-A and B-B of FIGS. 22A and 22b, the wall thickness at the outer ends of the major axes of the ovoid cross section portion of the preform is not maintained equal with the wall thickness of at and below the neck portion 712. Rather the wall thickness gradually increases from below the neck portion towards the lower end 718 of the preform.

It may be noted at this point, that in those forms of the perform as in this embodiment and that of the first preferred embodiment above, shaping the internal surface in these non-concentric forms of outer and inner surfaces, introduces considerable issues for the injection—moulding of the preforms.

Figure 24:
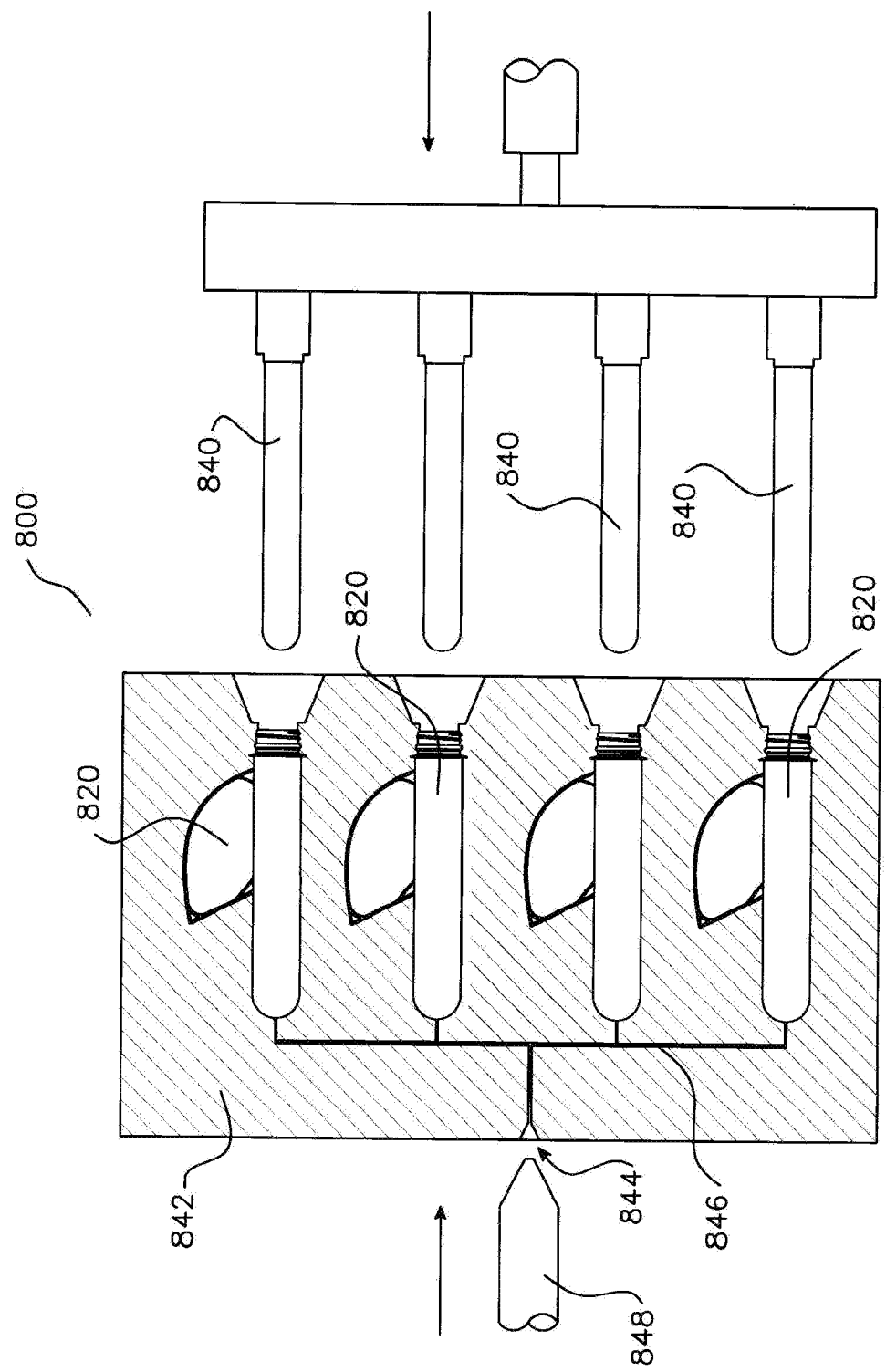
FIG. 24 is a schematic view of an injection moulding process for producing the preforms of FIGS. 13A and 19, 20 to 23.

As shown in FIG. 24, preforms, including those of the present invention, are typically injection moulded in multi-cavity dies 800 in which the cavities 820 in the die conform to the outer shape of the preform, including in the present cases, the shape of the integral handle.

In preforms with concentric wall thicknesses, that is, with circular cross sections, the mandrels 840 for forming the internal surfaces will also be of circular cross sections. Thus, the only requirement for positioning such a mandrel relative the injection-moulding cavity is its concentricity with the neck portion of the cavity.

A mandrel for producing an internal surface of a perform which is wholly or partially non-circular in section may firstly require, a considerably more complex machining operation and, secondly it must be specifically oriented in the injection-moulding cavity.

Mandrels for preforms with non-circular cross sections must be positioned within the cavities of an injection-moulding die 820, one half of which is shown in FIG. 24 so that the major axes of the ovoid portion are aligned relative to a vertical central plane of the cavities. For preforms according to the present invention with integral handles, that vertical plane is the plane on which the handle of the preform is centred as set out above (in effect the face 842 of the die half).

To be effective in biasing polymer material flow from different wall thickness areas of the preform towards designated regions of the blown container, the orientation of the preform must be maintained in the cavity of the stretch-blow-moulding machine. That is, the vertical plane of the preform must coincide with a defined vertical plane of the container. In the present invention the vertical plane of the preform is defined by the integral handle and is made coincident in the stretch-blow-moulding cavity with the central vertical plane of the blown container which again is central to the integral handle of the container.

In a moulding cycle, the die halves are brought together to close the die and the array of mandrels 840 driven into the cavities 820. The injection nozzle 848 is then advanced into the injection pocket 844 and molten polymer forced through the runner system 846 to fill the spaces between the external surfaces of the cavities 820 and the mandrels 840 to produce the preforms.

Although the above description has focused in some embodiments on use of ovoid or offset cross sections to vary the wall thicknesses of at least a portion of a preform at any given cross section of that portion, it will be understood that such variation can be achieved with other non-concentric shaping of the mandrel. Again, although the ovoid cross sections described for the preferred embodiment are centred on the vertical axis of the preform, other material distribution effects may be achieved by an asymmetric positioning of these cross section.

Sixth Preferred Preform Embodiment

This final preferred embodiment of a preform according to the invention and shown in FIG. 23, the preform 900 is provided with a wall thickness 911 in the region between the junction points 936 and 938 of the integrally injection-moulded handle 934 specifically to optimise control of the material in this region in the stretch-blow-moulding stage of producing a container from the preform.

In this embodiment, the external surface 910 of the preform is again substantially cylindrical. The internal surface of the preform is likewise formed of circular cross sections, but as can be seen in both the side sectioned view of FIG. 13A and cross section AA of FIG. 13A, the centres of a portion of the cross sections (typified by section A-A) do not lie on the central axis 930 of the body of the preform, but are offset towards the handle 934.

The effect is to "thin" the wall thickness in the region between the junction points 936 and 938 of the handle. This is possible and desirable, because firstly there is a lesser volume of material required to form the container since there is no longitudinal stretching of this region and, secondly the thinning provides a significant cost saving in material.

It will be understood that all the above embodiments of the preform seek to optimise both the distribution of the polymer material of the preform into the blown container and do so by reducing the weight and thus the volume of material for reasons of economy of production.

Seventh Preferred Preform Embodiment

Figure 28:
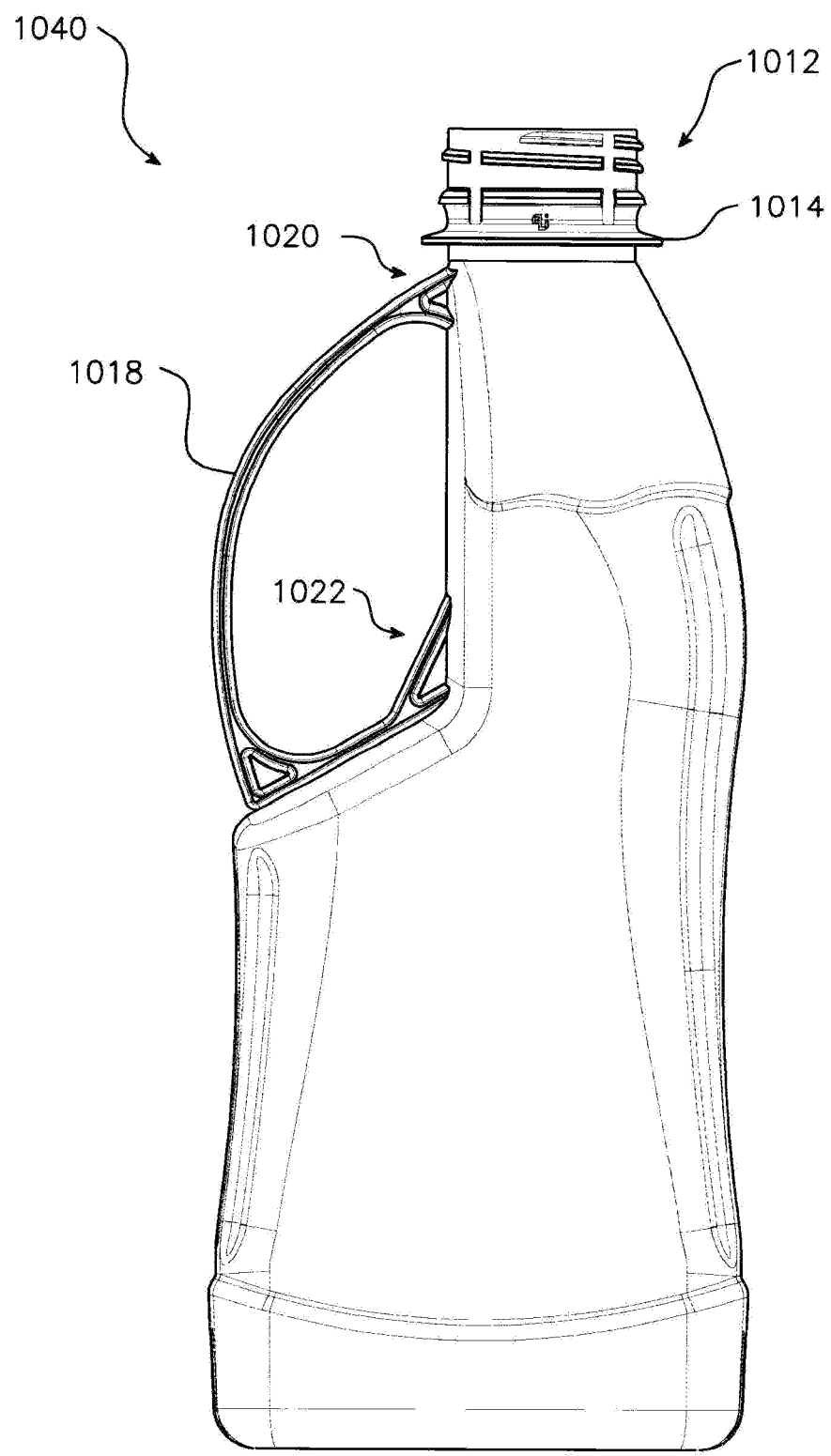
FIG. 28 is a side view of a container stretch-blow-moulded from the preform of FIGS. 26 and 27.

With reference to FIGS. 26 and 27, a preform 1000 for stretch-blow-moulding the container 1040 shown in FIG. 28, is comprised of a neck portion 1012, a collar 1014 and a body 1016 extending from below the collar. As in the preform according to prior art shown in FIG. 1, the preform 1000 includes an integral handle 1018 joined to the body 1016 at first junction position 1020 just below the collar 1014 and a second junction position 1022 along the length of the body.

The first cylindrical portion 1024 of the body extending below the collar 1014, is substantially of constant diameter, and in the region immediately below the collar, the diameter is substantially that of the finished container as can be seen in FIG. 28.

But it can be seen firstly from a comparison between the preform 1000 according to the present invention, and the preform of the prior art, that there is a significant reduction in diameter of the body 1016 below the first cylindrical portion 1024.

Furthermore, it is clear that this second portion 1026 of the body, between the reduction in diameter and the tangent line 1028 with the bottom portion 1030, is not cylindrical but forms a portion of a narrow cone, with the base diameter 1030 of the cone, that is its largest diameter, significantly smaller than the diameter of the first cylindrical portion 1024. Thus, this large reduction in diameter and the tapering provide a first significant reduction in the volume of PET contained in the preform of the invention.

Turning now to the cross-section view of FIG. 27, the walls of the body 1016 of the preform 1000, vary considerably in thickness. While the wall thickness of the neck portion 1012 and the first portion 1024 below the collar 1014 are substantially of a constant thickness, that of the second portion 1026 varies from a relatively thin wall section at the base diameter 1030, to a maximum thickness proximate the tangent line 1028.

The wall thickness of the bottom portion 1032 is further varied, being reduced from the maximum thickness at the tangent line 1028 to a minimum at the base of the bottom portion.

This thinning of the wall thickness in the region below the maximum diameter 1030 of the second portion 1026, augments the reduction in material volume provided by the diameter reduction and the form of the second portion 1026.

As well as providing savings in material volume, these variation in wall thicknesses are designed to evenly distribute the volume of PET material to various areas of the walls of the stretch-blow-moulded container 1040 shown in FIG. 28, to an average thickness of approximately 0.5 mm.

INDUSTRIAL APPLICABILITY

The continuous movement of previously injection moulded, non-symmetrical preforms from their initial feeding into the machine 10 through the various continuously rotating stages described above, provides a marked improvement in output and quality of containers stretch-blow-moulded from such preforms. This continuous flow from preform infeed to the outfeed of container is made possible by the unique features of the transfer systems of the machine and the control of orientation of the preform handles at each transfer and that of the preform supporting mandrels at transfers into and away from the preheating stage.

Figure 25:
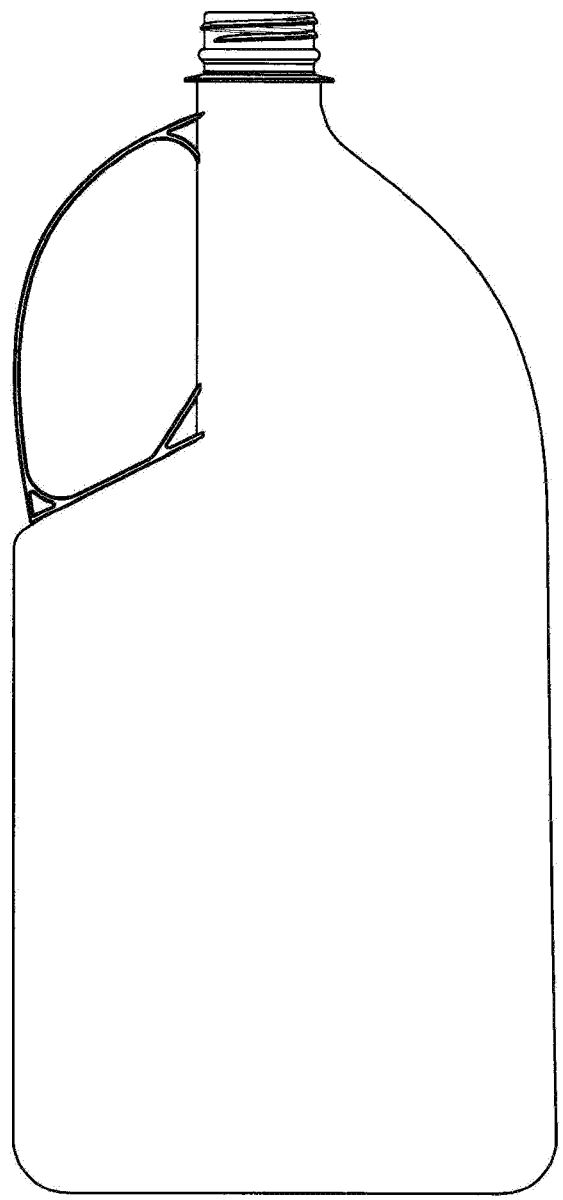
FIG. 25 is a container with integral handle as blow-moulded from the preform of FIG. 13.

The preforms of the above described embodiments, provide for the stretch-blow-moulding of a container in the stretch-blow-moulding machine, which is equal in capacity to that of the container of the prior art shown in FIG. 25, but with a significant reduction in the volume of PET and conferring an optimum distribution of material from the preform to form the containers shown in FIGS. 17 and 18. Thus, the preforms of the invention provides for a considerable reduction in raw material costs in the production of PET containers with integral handle.

The invention claimed is:

1. A non-incremental, continuously rotating, stretch-blow-moulding machine fed with non-symmetric injection moulded preforms with integral handles and producing stretch-blow-moulding of containers with integral handles from the non-symmetric injection moulded preforms with integral handles; the body portion of the preform and the integral handle constituted from the same material; the machine including a preform orientation system to orient the handle of the preform into a known orientation at arrival at a pick off position; orientation of the handles controlled during transfer of the preforms by a transfer system from the pick off position to a preheating stage of the machine; manipulation of the preforms respectively concurrently aligning axes of the body portions of the preforms with axes of preform supporting mandrels of the preheating stage and aligning the handles of the preforms for controlled preheating of the preforms while the preheating stage is in continuous rotation.

2. The machine of claim 1 wherein preforms are in continuous motion from an initial preform pick off point through stretch-blow-moulding into the containers and ejection from the machine as stretch-blow-moulded containers.

3. The machine of claim 1 wherein the integral handle retains a shape of the handle as injection moulded through all stages of the stretch-blow-moulding machine to forming a handle on the stretch-blow-moulded container.

4. The machine of claim 3 wherein the stages of the stretch-blow-moulding machine include a handle orientation stage; all preforms arriving at the pick off position having the integral handle oriented in a predetermined direction relative to motion of the preform approaching the pick off position.

5. The machine of claim 3 wherein the stages of the stretch-blow-moulding machine include a continuously rotating first transfer system transferring preforms from a continuously rotating preform feeder wheel at the preform pick off position to a transfer to preheating position at a continuously rotating preheating stage.

6. The machine of claim 5 wherein a first pick and place apparatus of the first transfer system includes a preform grasping gripper; reciprocating rotation and linear displacement of the grasping gripper induced by a combination of a rotating carrier of the pick and place apparatus and two cam loci.

7. The machine of claim 6 wherein the rotating carrier is an arm of four radially extending support arms rotating about a common centre of rotation; an outer end of each support arm rotationally supporting a pick and place apparatus.

8. The machine of claim 7 wherein the support arms rotate above a fixed cam plate; the cam plate provided with an inboard cam channel for a first locus of the two cam loci and a periphery of the cam plate providing an outer cam surface for a second locus of the two cam loci.

9. The machine of claim 7 wherein a housing of a linear guide of the pick and place apparatus is rotationally mounted at the outer end of the supporting arm; an outrigger arm extending from the housing provided with a first cam follower locating in the cam channel.

10. The machine of claim 9 wherein a free sliding element of the linear guide is provided with a second cam follower; the second cam follower maintained in contact with the outer cam surface by a spring.

11. A method of controllably heating a pre-form to a die introduction temperature in a non-incrementing, continuously rotating stretch-blow-moulding machine; the pre-form having a neck portion extending from a body portion; said pre-form further having an integral handle portion extending radially from the body portion; said method comprising
controllably transferring an integral handle PET pre-form onto a continuously moving conveyor of a preheating stage;
securing the preform by its neck portion to the conveyor whereby the preform is transported by the conveyor at substantially constant velocity along a reheating path from a pre-form entry location to a pre-form exit location;
at least portions of the pre-form controllably heated to the die introduction temperature by the time it reaches the pre-form exit location;
a controllable heater array distributed along the path arranged to direct heat to selected portions of the pre-form;
the pre-form controllably transferred from the preform exit location into a die for stretch blow moulding of the pre-form thereby to form a blown container, and
wherein, at entry into each of preheating stage and the stretch-blow-moulding stage the preform is oriented to control the alignment of the integral handle for controllably heating the portions of the preform and for alignment of the handle with the halves of the stretch-blow-moulding die.

12. The method of claim 11 wherein the handle portion is solid and has a first end and a second end; the first end integrally connected at a first, upper location to the pre-form; the second end integrally connected at a second, lower location to the pre-form.

13. The method of claim 12 wherein the first, upper location is located on the body portion.

14. The method of claim 12 wherein the first, upper location is located on the neck portion.

15. The method of claim 12 wherein the second, lower location is located on the body portion.

16. The method of claim 11 wherein elements are arranged in modules; the modules arrayed around a continuously rotating preform conveyer; the elements controlled as a group based on height wherein the top most elements of the modules are controlled to a predetermined temperature together whilst the next down in height elements are also controlled together to a predetermined temperature—and so on down to elements at the lowest level.

17. The method of claim 11 wherein a processor controls the speed of rotation of a motor in order to control the continuous speed of advancement of the preforms.

18. The method of claim 11 wherein a temperature sensor provides environment temperature sensing which is utilised by processor to modulate the degree of heating of all elements by a difference factor delta ($\Delta$).

19. A method of reducing material required to form a container stretch-blow-moulded from a preform in the stretch-blow-moulding machine of claim 1; the preform comprising a neck portion, a collar below the neck portion and a generally cylindrical body below the neck portion; the preform further including a handle extending from a first junction position below the collar to a second junction position along the body of the preform; the method including the steps of:
Forming the body of the preform in at least two portions of different configuration; a first cylindrical portion and a second conical portion;
Reducing a base diameter of the conical portion relative to a diameter of the first cylindrical portion.

20. The method of claim 19 wherein wall thickness of the second portion varies from a minimum thickness proximate the base diameter of the conical portion to a maximum thickness proximate a tangent line between the second conical portion and a bottom portion of the preform.

21. A continuously rotating, non-symmetric preform feed, stretch-blow-moulding machine dedicated to the stretch-blow-moulding of containers from non-symmetric injection moulded preforms; the non-symmetrical preforms including an integral handle; the body of the preform and the integral handle constituted from the same material; the machine including a preform orientation system to orient the handle of the preform into a known orientation at arrival at a continuously rotating preheating stage.

22. The machine of claim 21 wherein preform supporting mandrels of a conveyor of the continuously rotating preheating transport system are provided with heat shields; the shields protecting the handle from excessive heat absorption.

23. The machine of claim 22 wherein a pick and place apparatus of a first transfer system brings a vertical axis of the perform into alignment with a vertical axis of a cylindrical collar of a preform supporting mandrel at the transfer to preheating stage; the gripper of the pick and place apparatus concurrently manoeuvring the handle of the pre-form between side elements of a channel of the heat shield.

24. The machine of claim 23 wherein a preheated preform is extracted from the supporting mandrel by a pick and place apparatus of a second transfer system at a transfer from the preheating stage to a stretch-blow-moulding stage; the transfer from the supporting mandrel position lying on a line joining respective centres of rotation of a proximate rotating guide wheel of the preheating transport system and the second transfer system.

25. The machine of claim 24 wherein a combination of rotation of an arm of the second transfer system and rotation and linear displacement of a gripper of the second transfer system induced by loci of a first and second cam follower of the pick and place apparatus, brings a vertical axis of the preform into alignment with a vertical axis of a stretch-blow-moulding die as both the pick and place apparatus and an opened stretch-blow-moulding die approach a die loading position; movements of the gripper concurrently bringing the handle of the preform into alignment with a line joining respective centres of rotation of the stretch-blow-moulding die and the second transfer system.

\* \* \* \* \*